United States Patent
Kiyama et al.

(10) Patent No.: US 10,442,407 B2
(45) Date of Patent: Oct. 15, 2019

(54) WASHER NOZZLE, WIPER ARM EQUIPPED WITH NOZZLE, AND VEHICLE WIPER DEVICE

(71) Applicant: ASMO CO., LTD., Kosai-shi, Shizuoka (JP)

(72) Inventors: Masaaki Kiyama, Hamamatsu (JP);
Kouichi Hirao, Hamamatsu (JP);
Masanori Takeuchi, Aichi-ken (JP);
Yoshiyuki Uchino, Kosai (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 276 days.

(21) Appl. No.: 15/310,447

(22) PCT Filed: May 15, 2015

(86) PCT No.: PCT/JP2015/064098
§ 371 (c)(1),
(2) Date: Nov. 16, 2016

(87) PCT Pub. No.: WO2015/178319
PCT Pub. Date: Nov. 26, 2015

(65) Prior Publication Data
US 2017/0080903 A1     Mar. 23, 2017

(30) Foreign Application Priority Data

May 19, 2014 (JP) .................. 2014-103480
May 21, 2014 (JP) .................. 2014-105488
(Continued)

(51) Int. Cl.
*B60S 1/52*     (2006.01)
(52) U.S. Cl.
CPC ............... *B60S 1/524* (2013.01); *B60S 1/522* (2013.01)

(58) Field of Classification Search
CPC ....................................................... B60S 1/522
(Continued)

(56) References Cited

U.S. PATENT DOCUMENTS

| 5,267,693 A * | 12/1993 | Dickey | B05B 15/00 239/417.3 |
| 6,393,652 B1 * | 5/2002 | Vogt | B60S 1/522 15/250.01 |

(Continued)

FOREIGN PATENT DOCUMENTS

| DE | 19914122 A1 * | 9/2000 | ............ B60S 1/3806 |
| FR | 2994144 A1 * | 2/2014 | ............ B60S 1/3862 |

(Continued)

OTHER PUBLICATIONS

JP2002370625A (machine translation) (Year: 2002).*
DE19914122A1 (machine translation) (Year: 2000).*
FR2994144A1 (machine translation) (Year: 2014).*

*Primary Examiner* — Andrew A Horton
(74) *Attorney, Agent, or Firm* — Solaris Intellectual Property Group, PLLC

(57) ABSTRACT

A washer nozzle comprises: a nozzle connecting portion to which a hose, that supplies a washing liquid, is connected; a nozzle main body portion that has, at an interior thereof, a flow path that communicates with an interior of the nozzle connecting portion and that has a jetting hole that opens toward an exterior at one end side of the nozzle main body portion, the nozzle main body portion jetting the washing liquid out toward a windshield glass of a vehicle from the jetting hole; and a water repellent portion that, at at least a portion of the flow path, structures an inner peripheral surface that extends to the jetting hole, and that is formed of a material that is water repellent.

19 Claims, 16 Drawing Sheets

(30) Foreign Application Priority Data

May 28, 2014 (JP) .................................. 2014-110255
Jun. 10, 2014 (JP) .................................. 2014-119591

(58) Field of Classification Search
USPC ...................................................... 15/250.04
See application file for complete search history.

(56) References Cited

U.S. PATENT DOCUMENTS

| | | |
|---|---|---|
| 2003/0009841 A1 | 1/2003 | Sato |
| 2006/0283985 A1* | 12/2006 | Ikeuchi ..................... B05B 1/26 239/543 |
| 2007/0018012 A1* | 1/2007 | Harris ....................... B05B 1/00 239/284.1 |
| 2007/0089257 A1 | 4/2007 | Harita et al. |
| 2013/0152320 A1* | 6/2013 | Matsumoto ........... B60S 1/3801 15/250.01 |
| 2013/0269139 A1 | 10/2013 | Wolfgarten |
| 2015/0113754 A1 | 4/2015 | Umeno |

FOREIGN PATENT DOCUMENTS

| | | | |
|---|---|---|---|
| JP | H7-329734 A | | 12/1995 |
| JP | H10-502313 A | | 3/1998 |
| JP | 2002-67886 A | | 3/2002 |
| JP | 2002237065 A | * | 8/2002 |
| JP | 2003-25968 A | | 1/2003 |
| JP | 2007-112392 A | | 5/2007 |
| JP | 2012-158263 A | | 8/2012 |
| JP | 2013-244874 A | | 12/2013 |
| JP | 2014-501197 A | | 1/2014 |

* cited by examiner

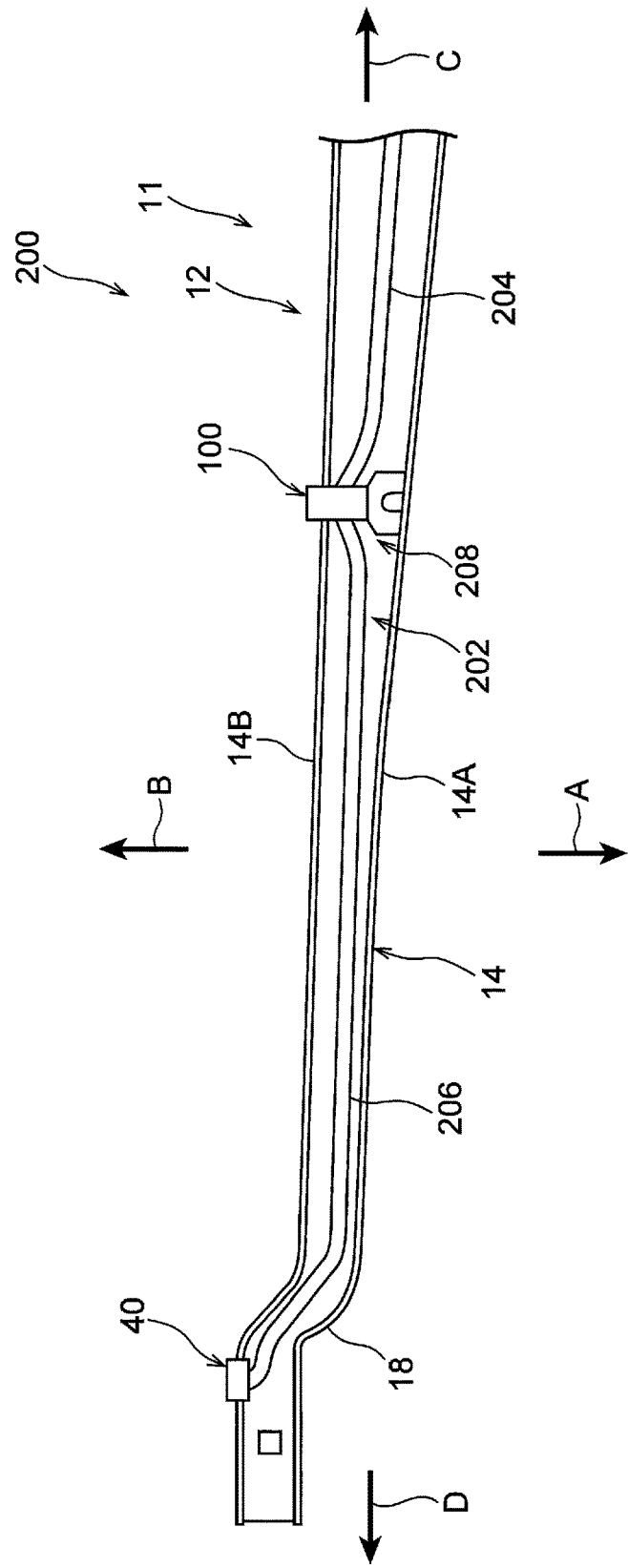

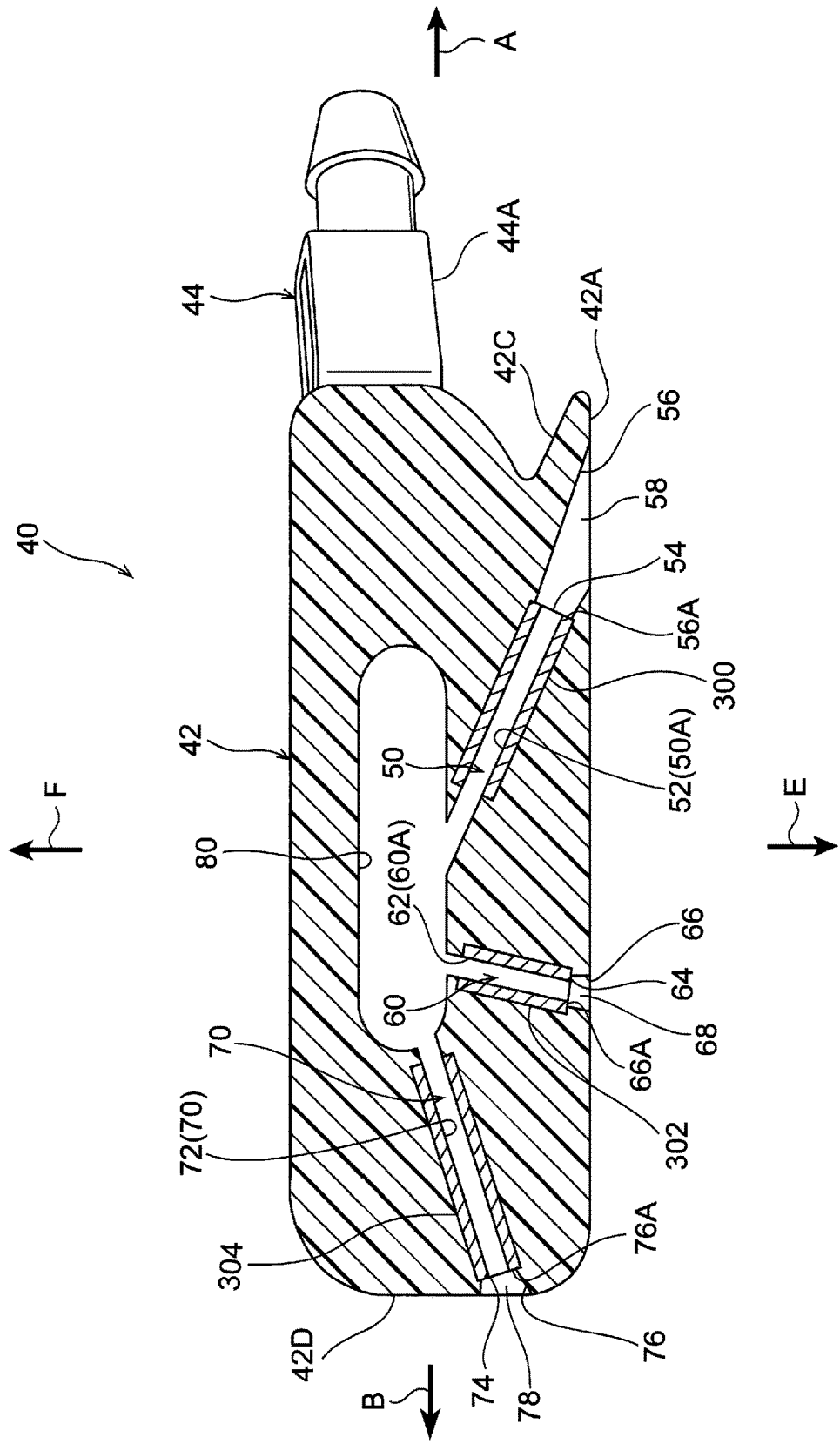

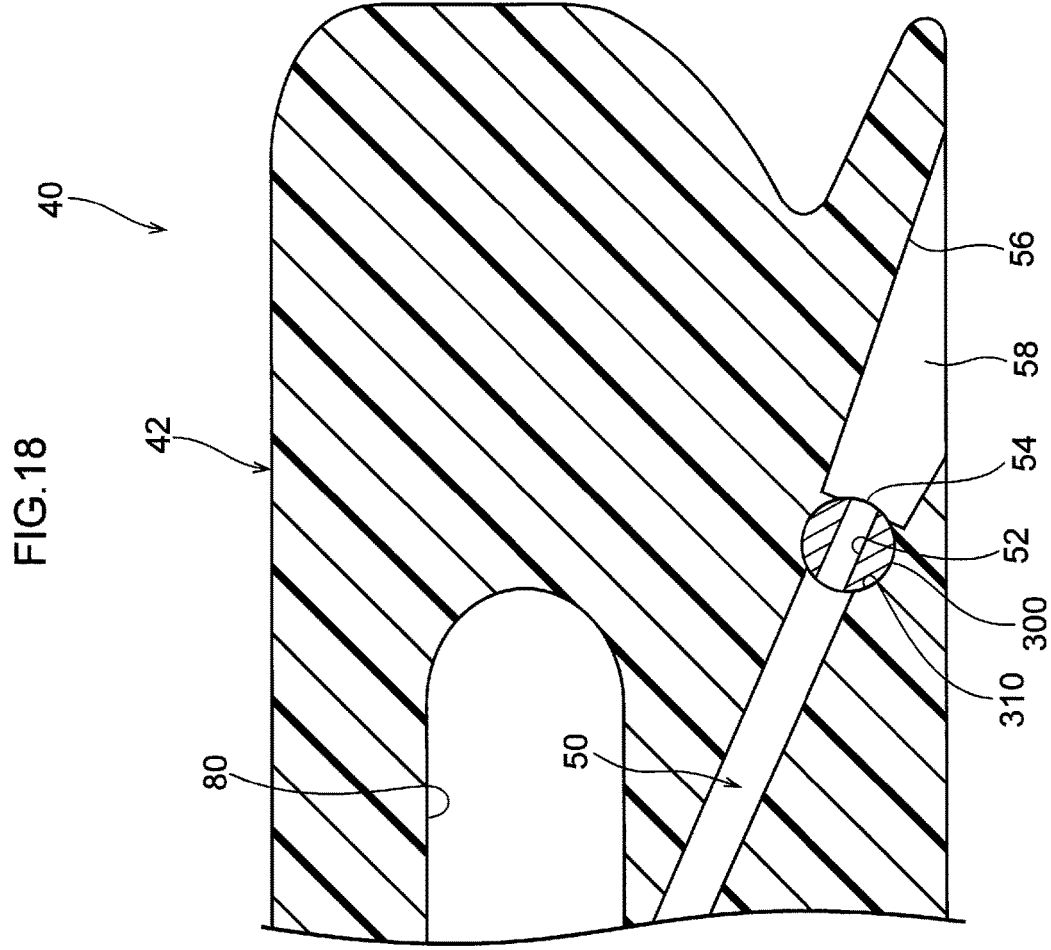

WASHER NOZZLE, WIPER ARM EQUIPPED WITH NOZZLE, AND VEHICLE WIPER DEVICE

TECHNICAL FIELD

The present invention relates to a washer nozzle, and to a wiper arm equipped with a nozzle that has the washer nozzle, and to a vehicle wiper device.

BACKGROUND ART

Among washer nozzles, there are those in which a film-like heater is provided at a washer nozzle (see, for example, Japanese Patent Application Publication (JP-A) No. H7-329734). Due thereto, even in a case in which water or the like, that has stuck to a jetting hole of the washer nozzle, freezes in a cold geographical region, the frozen ice can be melted by heating the washer nozzle by the heater. As a result, washing liquid can be jetted-out well from the jetting hole.

Further, among vehicle wiper devices, there are those having a wiper arm equipped with a nozzle, in which a washer nozzle is mounted to the wiper arm and washing liquid is jetted-out from the washer nozzle onto a windshield glass (for example, JP-A No. 2002-67886). Due thereto, the washing liquid can be supplied efficiently onto a surface to be wiped of the windshield glass.

SUMMARY OF INVENTION

Technical Subject

However, at a washer nozzle that has a heater, there is the need to arrange a lead wire that is connected to a resistor of a heater provided at the washer nozzle, and therefore, this leads to an increase in cost.

Further, in a vehicle wiper device that has a wiper arm equipped with a nozzle, the washer nozzle projects-out toward a transverse direction outer side of the wiper arm. Further, in a case in which airflow, that flows from a base end side toward a distal end side of the wiper arm, arises at the side of the wiper arm, the washing liquid that is jetted-out from the washer nozzle is affected by this airflow. Therefore, in a usage environment in which this airflow arises, there is the concern that, depending on the airflow, it may not be possible to make the washing liquid that is jetted-out from the washer nozzle land on a predetermined position (i.e., the nozzle performance will deteriorate). Due to the above, it is desirable to make the washer nozzle be a structure that can maintain the nozzle performance with respect to changes in the usage environment, while suppressing an increase in costs.

In view of the above-described circumstances, an object of the present invention is to provide a washer nozzle, a wiper arm equipped with a nozzle, and a vehicle wiper device that can maintain the nozzle performance with respect to changes in the usage environment, while suppressing an increase in cost.

Solution to Subject

A washer nozzle of the present disclosure comprises: a nozzle connecting portion to which a hose, that supplies a washing liquid, is connected; a nozzle main body portion that has, at an interior thereof, a flow path that communicates with an interior of the nozzle connecting portion and that has a jetting hole that opens toward an exterior at one end side of the flow path, the nozzle main body portion jetting the washing liquid out toward a windshield glass of a vehicle from the jetting hole; and a water repellent portion that, at at least a portion of the flow path, structures an inner peripheral surface that extends to the jetting hole, and the water repellent portion is formed of a material that is water repellent.

In accordance with the above-described structure, the washer nozzle is structured to include the nozzle connecting portion and the nozzle main body portion. Further, a hose is connected to the nozzle connecting portion, and washing liquid is supplied to the nozzle connecting portion by the hose. Further, the flow path, that communicates with the interior of the nozzle connecting portion, is provided at the interior of the nozzle main body portion. This flow path has a jetting hole at one end side thereof, and the jetting hole opens to the exterior of the nozzle main body portion. Due thereto, washing liquid that is supplied to the washer nozzle is jetted-out from the jetting hole toward the windshield glass of the vehicle.

Here, at at least a portion of the flow path, the inner peripheral surface that extends to the jetting hole is made to be a water repellent portion, and this water repellent portion is formed of a material that is water repellent. Therefore, when liquid such as water or the like attempts to enter into the flow path from the jetting hole, that liquid is repelled by the water repellent portion. Due thereto, even in a case in which, for example, the jetting hole is covered by the liquid, the liquid being drawn-into the flow path from the jetting hole and remaining at the jetting hole region can be reduced or prevented. Due thereto, in cold geographical regions, liquid that remains at the jetting hole region freezing and the jetting hole becoming blocked can be decreased or prevented. As a result, the washing liquid can be jetted-out from the jetting hole without using a heater for melting liquid that has frozen at the jetting hole.

Further, a washer nozzle of the present disclosure comprises: a nozzle main body portion provided at a wiper arm that is rotated reciprocally around an axis of a pivot shaft, and the nozzle main body projects-out toward a transverse direction outer side of the wiper arm; a flow path that is formed at an interior of the nozzle main body portion, and the flow path has a jetting hole that opens toward a windshield glass side; and a flow rectifying portion that structures an outer peripheral portion of the nozzle main body portion, and the flow rectifying portion is disposed at a base end side of the wiper arm with respect to the jetting hole, and the flow rectifying portion, as seen from a transverse direction of the wiper arm, is inclined toward the windshield glass side while heading toward the base end side of the wiper arm, and rectifies an airflow that flows from the base end side toward a distal end side of the wiper arm.

In accordance with the above-described structure, the washer nozzle is provided at a wiper arm that is rotated reciprocally around the axis of a pivot shaft. The nozzle main body portion of the washer nozzle projects out toward a transverse direction outer side of the wiper arm. Further, the flow path is formed at the interior of the nozzle main body portion, and the flow path has the jetting hole that opens toward the windshield glass side. Due thereto, washing liquid is jetted-out from the jetting hole of the flow path toward the windshield glass.

Here, the flow rectifying portion that structures the outer peripheral portion of the nozzle main body portion is disposed at the base end side of the wiper arm with respect to the jetting hole, and, as seen from the transverse direction of the wiper arm, the flow rectifying portion is inclined toward the windshield glass side while heading toward the base end side of the wiper arm. Therefore, the airflow, that flows from the base end side toward the distal end side of the wiper arm, is rectified by the flow rectifying portion, and the airflow flowing-in between the nozzle main body portion and the windshield glass is suppressed. Due thereto, airflow that hits the washing liquid jetted out from the jetting hole is suppressed. Accordingly, effects of the airflow that flows from the base end side toward the distal end side of the wiper arm are suppressed, and the washing liquid can be jetted-out well from the jetting hole.

BRIEF DESCRIPTION OF DRAWINGS

FIG. 16 is a bottom view that is seen from the arm lower side and that schematically shows a wiper arm that is used in a vehicle wiper device of a second embodiment.

FIG. 17 is a side sectional view that corresponds to FIG. 1 and that illustrates another example of the washer nozzle shown in FIG. 1.

FIG. 18 is a partial enlarged sectional view of the washer nozzle and shows another example of a tubular member shown in FIG. 17.

DESCRIPTION OF EMBODIMENTS

First Embodiment

Figure 2:
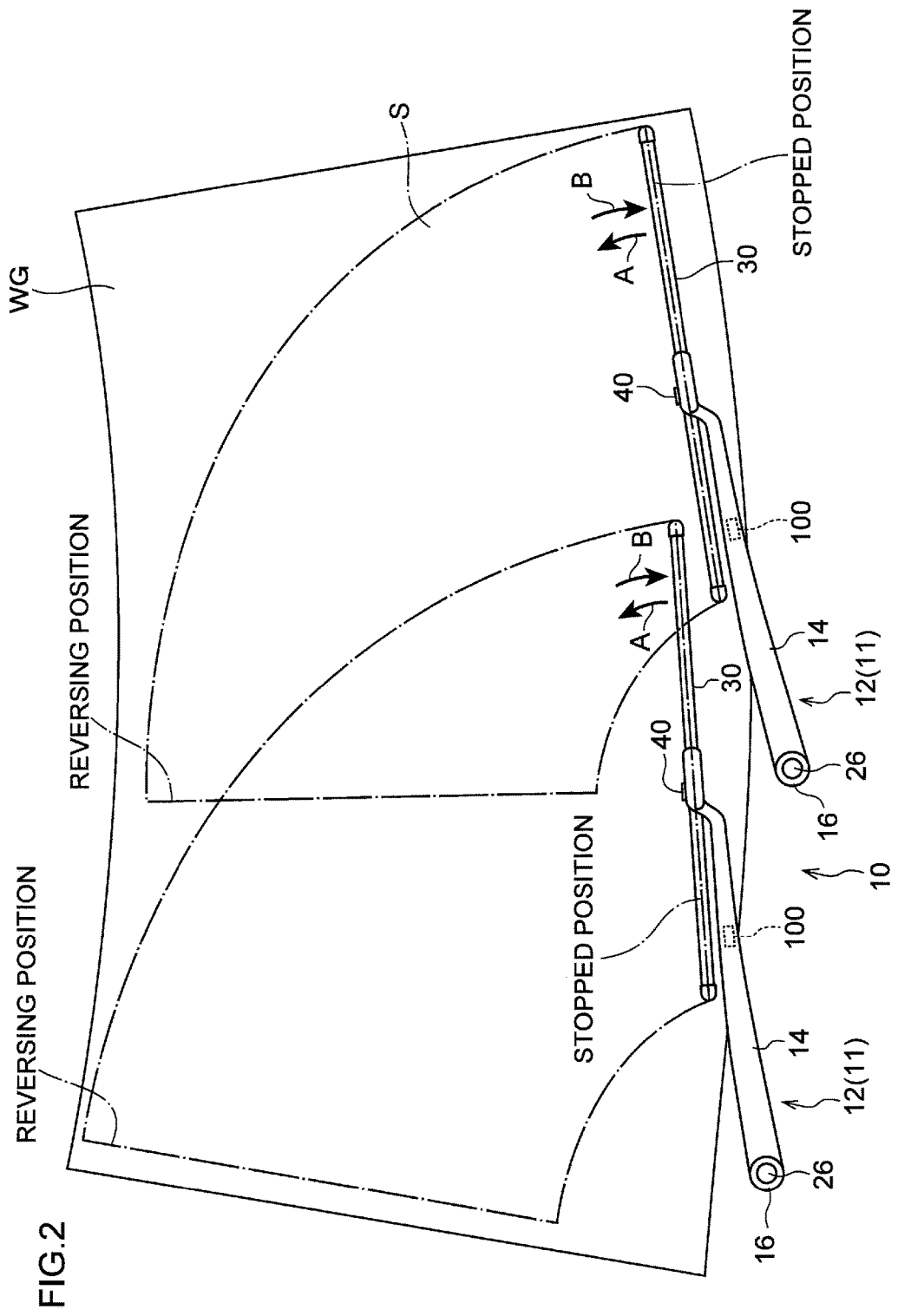
FIG. 2 is a plan view that is seen from an outer side of a surface to be wiped, and that shows an entire vehicle wiper device that uses the washer nozzle shown in FIG. 1.

A vehicle wiper device 10, that has a main nozzle 40 that serves as a "washer nozzle" according to a first embodiment, is described hereinafter by using the drawings. As shown in FIG. 2, the vehicle wiper device 10 is structured to include wiper arms 11 equipped with nozzles that have the main nozzles 40 and sub-nozzles 100 that jet-out a washing liquid, and wiper blades 30 that wipe a surface S to be wiped of a windshield glass WG of the vehicle (automobile). The above structures are described hereinafter.

(Regarding the Wiper Arm 11 Equipped with Nozzle)

Figure 3:
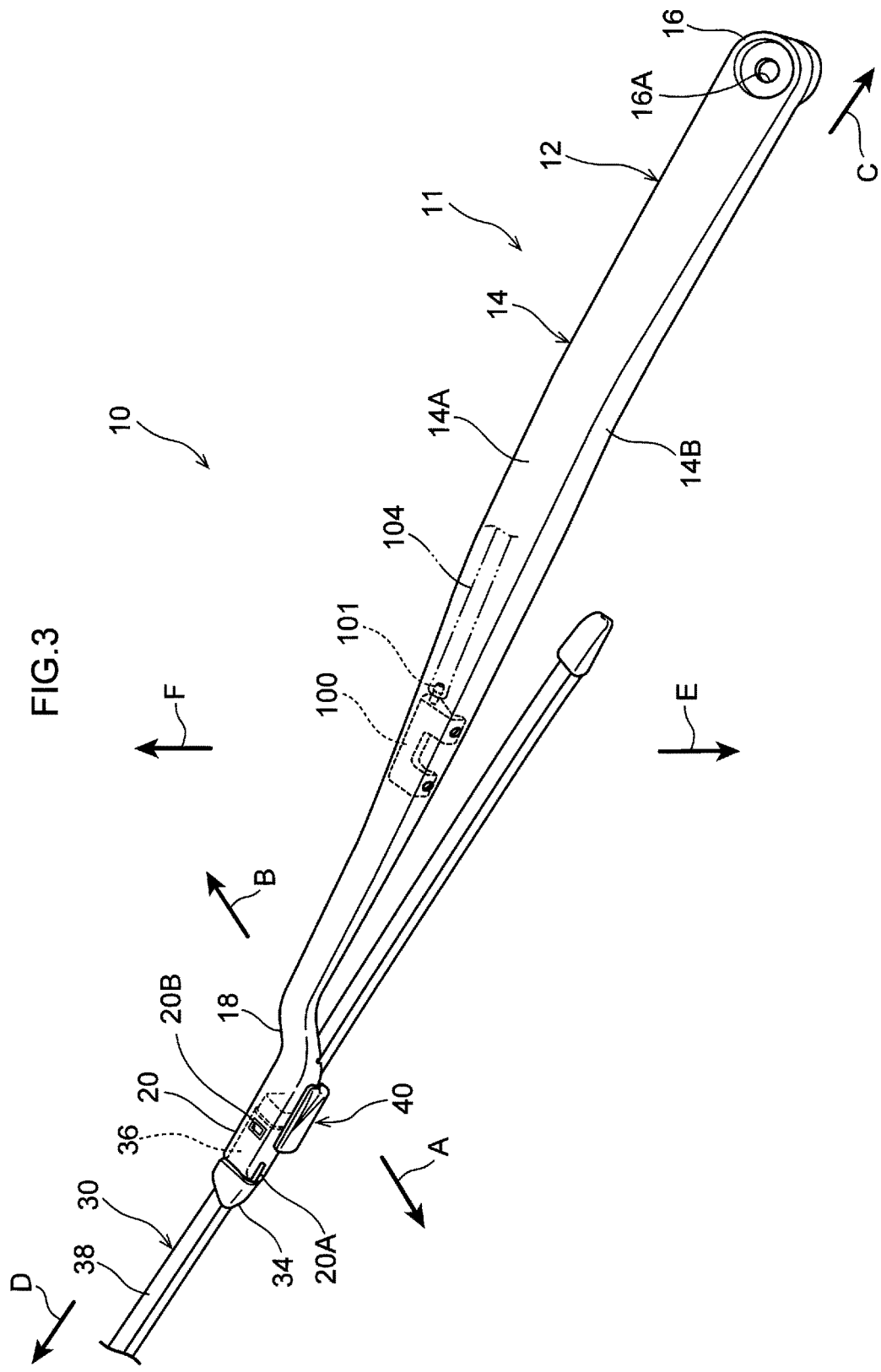
FIG. 3 is a perspective view in which a wiper arm shown in FIG. 2 is seen from an arm upper side.
Figure 4:
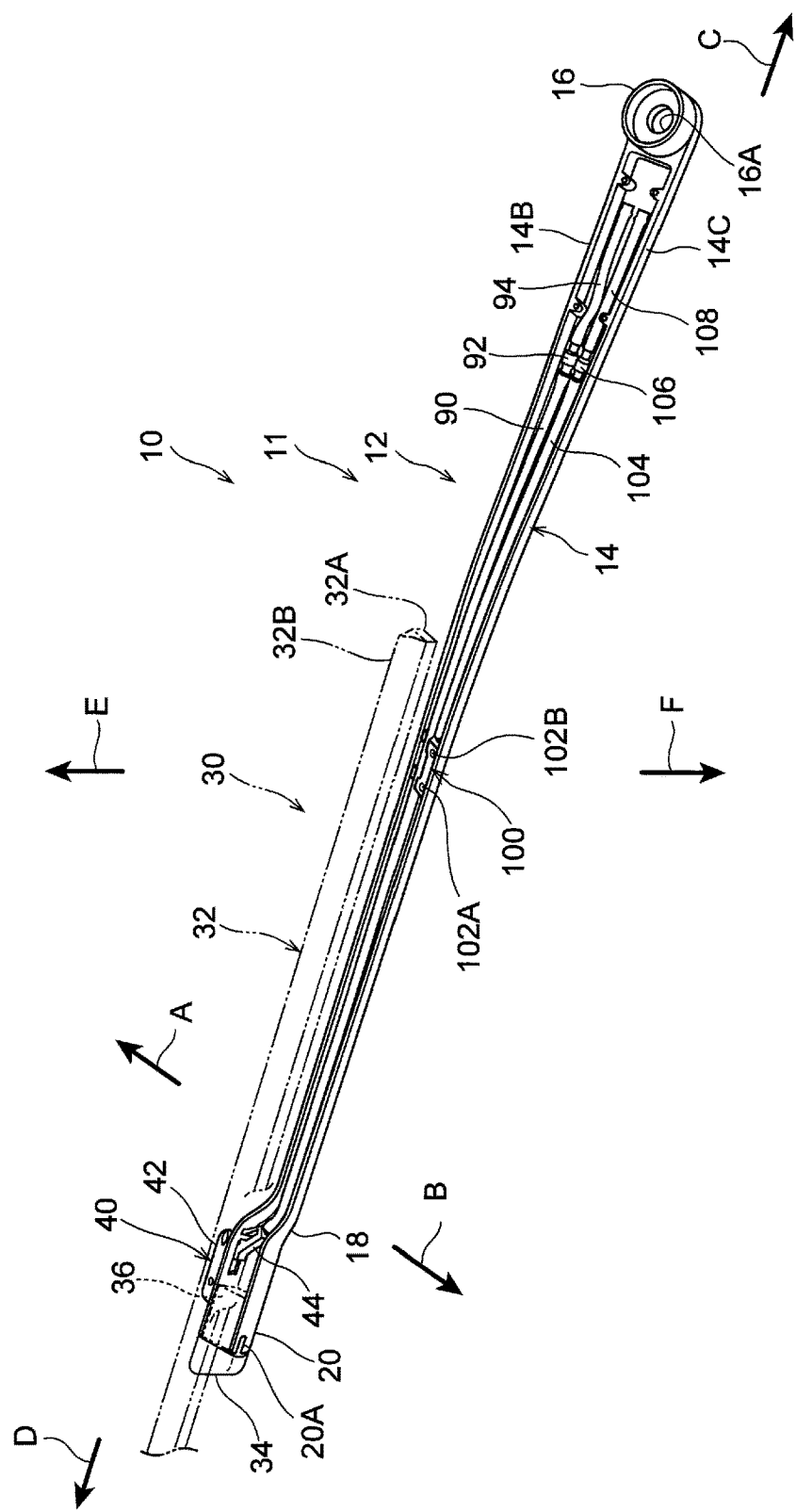
FIG. 4 is a perspective view in which the wiper arm shown in FIG. 2 is seen from an arm lower side.

As shown in FIG. 3 and FIG. 4, the wiper arm 11 equipped with a nozzle is structured to include a wiper arm 12 that is formed in a substantially elongated shape, the main nozzle 40 that serves as a "washer nozzle" and that is provided at a distal end portion of the wiper arm 12, and the sub-nozzle 100 that is provided at a length direction intermediate portion of the wiper arm 12. The wiper arm 12 has an arm main body portion 14 that is formed in an elongated shape, and the arm main body portion 14 is disposed so as to face the windshield glass WG in the thickness direction (the direction orthogonal to the surface S to be wiped) of the windshield glass WG (not shown in FIG. 3 and FIG. 4). Further, in the following description, a length direction one side of the wiper arm 12 (the arrow C direction side shown in FIG. 3) is called an arm base end side, and length direction another side of the wiper arm 12 (the arrow D direction side shown in FIG. 3) is called an arm distal end side. Further, a windshield glass WG side (the arrow E direction side shown in FIG. 3) with respect to the arm main body portion 14 is called an arm lower side, and a side (the arrow F direction side shown in FIG. 3) opposite the windshield glass WG with respect to the arm main body portion 14 is called an arm upper side.

The arm main body portion 14 is formed in a substantial U-shape in cross-section (an open cross-sectional structure) that opens toward the arm lower side as seen in the length direction thereof. Concretely, the arm main body portion 14 has a top wall portion 14A, and a pair of side wall portions 14B, 14C (see FIG. 4) that extend toward the arm lower side respectively from the transverse direction both ends of the top wall portion 14A and that face one another and are apart from one another. Further, the arm main body portion 14 is covered from the arm lower side by an unillustrated reverse surface cover.

A fixing portion 16, that is substantially shaped as a cylindrical tube having a bottom and that opens toward the arm upper side, is formed at the arm base end side of the arm main body portion 14. A through-hole 16A that is circular is formed coaxially in an axially central portion of the bottom portion of the fixing portion 16. Further, the base end portion of the wiper arm 12 is fixed to a pivot shaft 26 due to the distal end portion of the pivot shaft 26 (see FIG. 2) being inserted-through an through-hole 16A interior from the arm lower side and being fixed thereto. The pivot shaft 26 is supported so as to rotate freely at a pivot holder (not shown) that is fixed to the frame or the like of the vehicle, and is connected to a wiper motor (not illustrated) via a link mechanism.

Further, due to the pivot shaft 26 rotating reciprocally caused by a driving force of a wiper motor WM (see FIG. 12), as shown in FIG. 2, the wiper arm 12 rotated reciprocally between a stopped position (the position illustrated by the solid line in FIG. 2) and a reversing position (the position illustrated by the one-dot chain line in FIG. 2). Note that a direction in which the wiper arm 12 heads from the stopped position toward the reversing position (the arrow A direction in FIG. 2) is a rotating direction one side (the going side of the reciprocal rotation), and a direction in which the wiper arm 12 heads from the reversing position toward the stopped position (the arrow B direction in FIG. 2) is rotating direction another side (the returning side of the reciprocal rotation). Further, the rotating direction one side with respect to the wiper arm 12 coincides with a transverse direction one side of the wiper arm 12, and the rotating direction other side with respect to the wiper arm 12 coincides with the transverse direction other side of the wiper arm 12.

Further, as shown in FIG. 3 and FIG. 4, a transversely bent portion 18 that is bent in the shape of a crank is formed at the distal end side of the arm main body portion 14. The distal end portion of the arm main body portion 14 is offset toward the rotating direction one side with respect to the base end portion thereof. Further, a portion, that is further toward the distal end side than the transversely bent portion 18, at the arm main body portion 14 is an arm side connecting portion 20, and the arm side connecting portion 20 corresponds to the distal end portion of the wiper arm 12.

Figure 5:
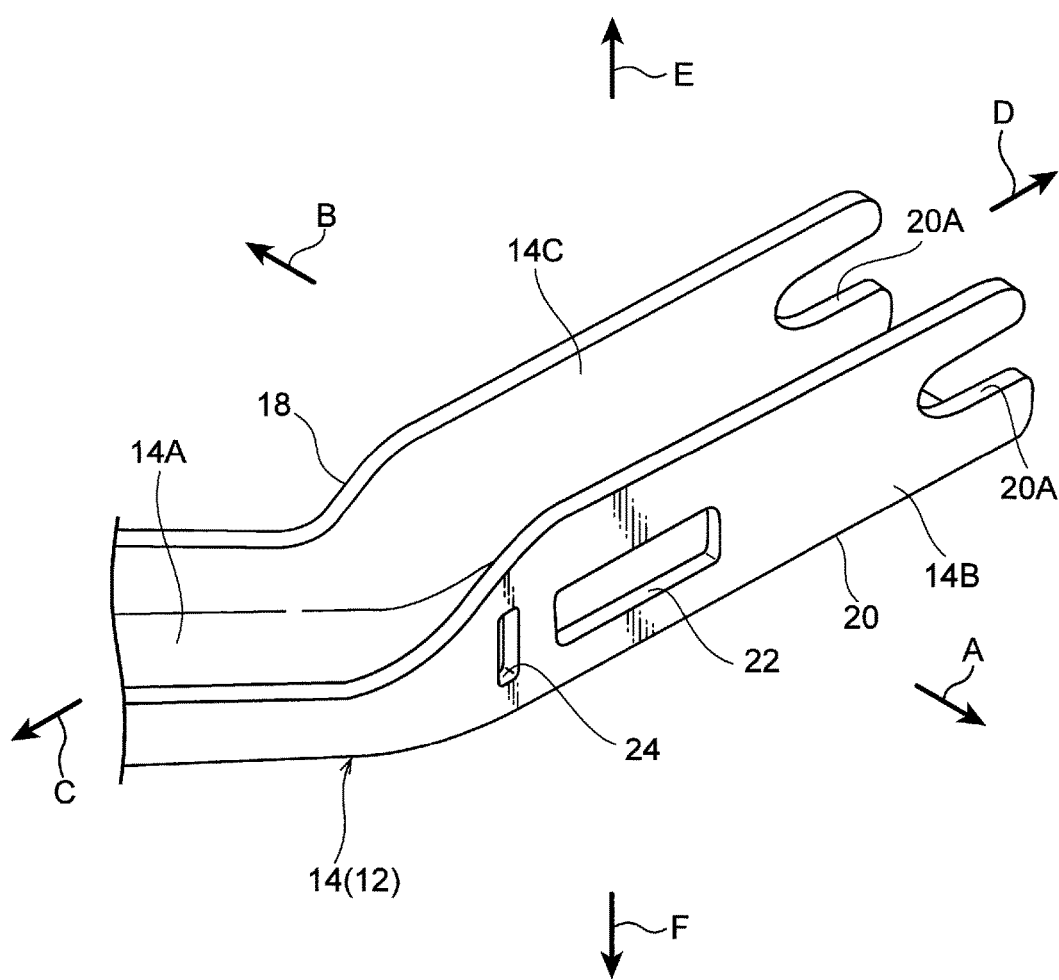
FIG. 5 is a perspective view that is seen from the arm lower side and that shows a distal end portion of an arm main body portion shown in FIG. 4.
Figure 6:
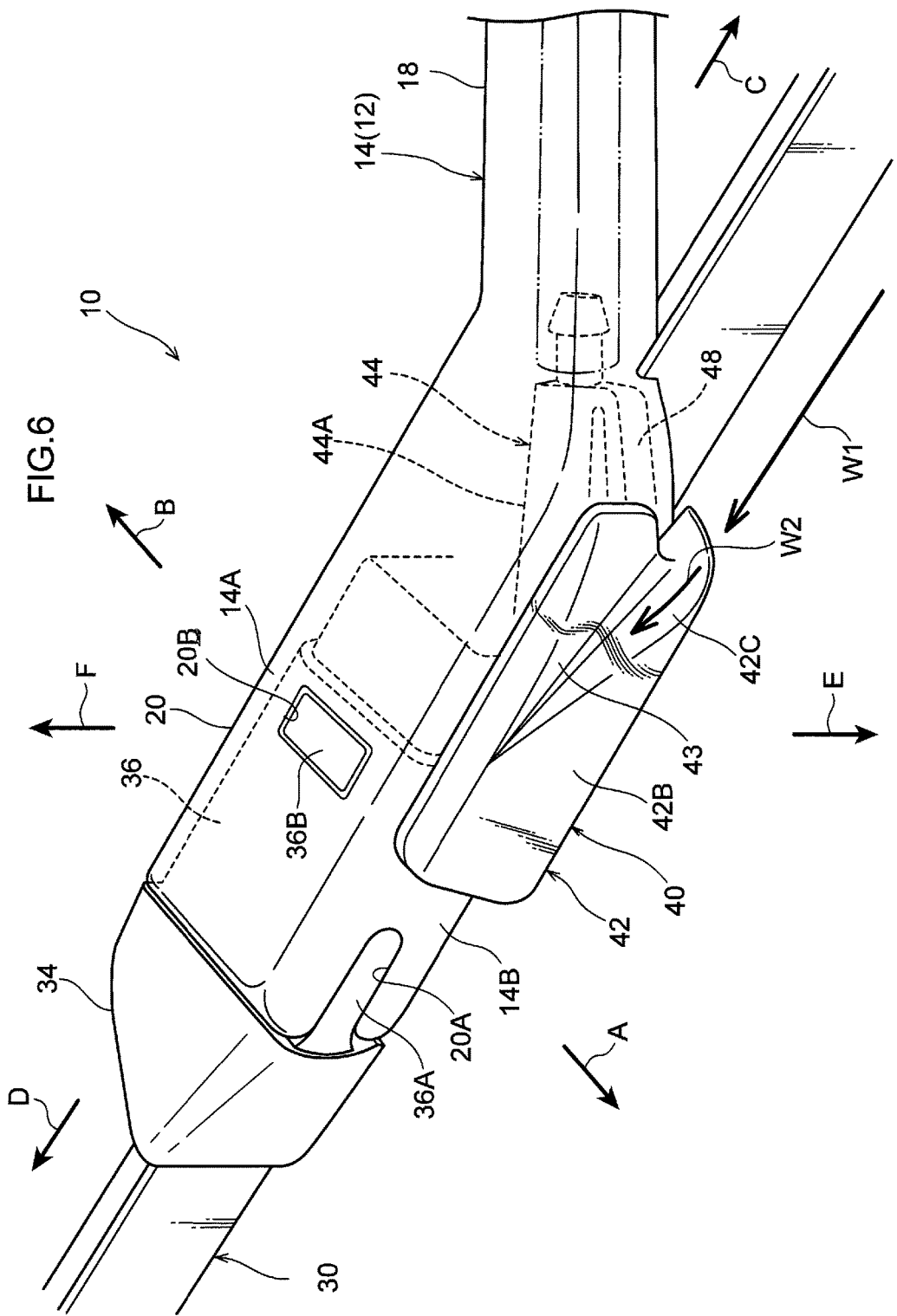
FIG. 6 is a perspective view showing, in an enlarged manner, a distal end portion of the wiper arm shown in FIG. 3.
Figure 7:
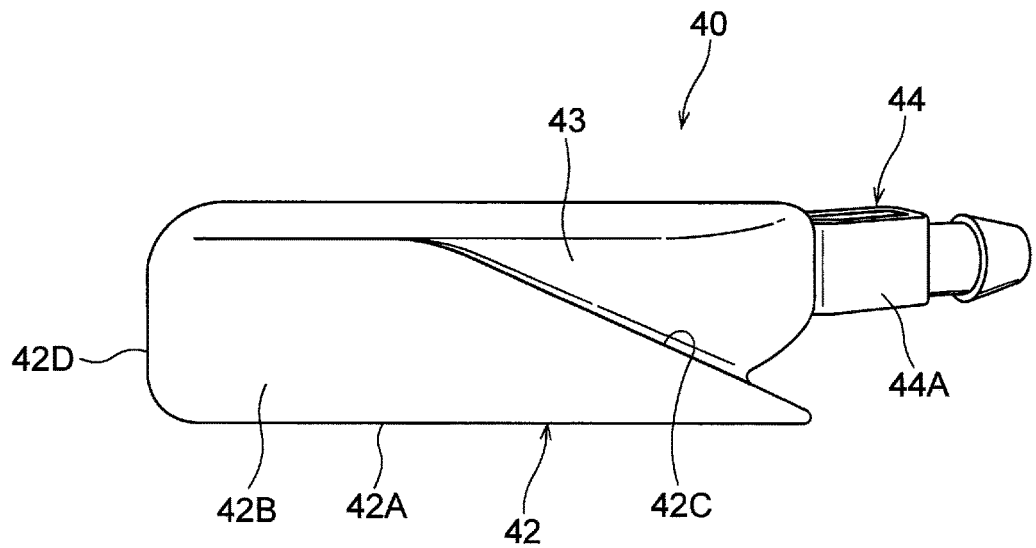
FIG. 7 is a side view showing the washer nozzle shown in FIG. 6.

As shown in FIG. 5, fixing grooves 20A for fixing a clip 36 that is described later, are formed in the side wall portions 14B, 14C at the arm side connecting portion 20, and the fixing grooves 20A open toward the distal end side of the wiper arm 12. Further, as shown in FIG. 6, a fixing hole 20B, that is substantially rectangular and is for fixing the clip 36 that is described later, is formed so as to pass-through the top wall portion 14A at the arm side connecting portion 20.

Moreover, as shown in FIG. 5, an insert-through hole 22, through which a nozzle connecting portion 44 of the main nozzle 40 that is described later is inserted, is formed so as to pass-through the side wall portion 14B at the transverse direction one side of the arm side connecting portion 20, and the insert-through hole 22 is formed in a substantially rectangular shape. Further, an engaging hole 24, with which an engaging hook 48 of the main nozzle 40 that is described later is engaged, is formed so as to pass-through the side wall portion 14B at a position that is at the arm base end side with respect to the insert-through hole 22. The engaging hole 24 is formed in a substantially rectangular shape whose length direction is the arm vertical direction.

(Regarding Wiper Blade 30)

As shown in FIG. 4, the wiper blade 30 is formed in a substantially elongated shape running along the length direction of the wiper arm 12. Further, the length direction central portion of the wiper blade 30 is connected to the arm side connecting portion 20 via a connecting lever 34 that is described later. Due thereto, as seen from the arm vertical direction, the wiper blade 30 is disposed at the rotating direction one side with respect to the portion, other than the arm side connecting portion 2, of the wiper arm 12.

The wiper blade 30 has a blade rubber 32 made of rubber and is formed in a substantially elongated shape. The blade rubber 32 is structured by a base portion 32A, that has a substantially rectangular cross-sectional shape and is disposed at the upper portion side of the blade rubber 32, and a wiping portion 32B that has a substantially triangular cross-sectional shape and is connected via a neck portion from this base portion 32A. A lip, that contacts and wipes the surface S of the windshield glass WG, is formed at the distal end portion (the lower end portion) of the wiping portion 32B. Further, a backing (not illustrated), that is shaped as a substantially elongated plate and is structured by a spring plate material, is disposed at the upper surface of the base portion 32A. Further, the base portion 32A and the backing of the blade rubber 32 are held in a state of being covered by a holding case (not illustrated) that is formed in an elongated shape and whose cross-sectional shape is substantially C-shaped.

As shown in FIG. 6, the connecting lever 34 is provided at the length direction central portion of the wiper blade 30. The connecting lever 34 is formed in a substantial block shape, and is disposed so as to be lined-up with the aforementioned holding case in the length direction of the wiper blade 30. A holding claw, that is not illustrated and that is shaped as a long rail, is formed at the lower portion of the connecting lever 34 at the portion thereof that is at the windshield glass WG side. Further, at the length direction central portion of the wiper blade 30, relative movement in the length direction between the backing and the connecting lever 34 is impeded, and the base portion 32A and the backing of the blade rubber 32 are held by the holding claw in a state of being accommodated within the connecting lever 34.

The clip 36 is provided at the portion, that is at the base end side (the arrow C direction side in FIG. 6) of the wiper arm 12, at the connecting lever 34. This clip 36 is formed in a substantial U-shape in cross-section that opens toward the arm lower side, and covers, from the arm upper side, the base end side portion of the connecting lever 34. Further, the distal end portion of the clip 36 is rotatably supported at the connecting lever 34 with the transverse direction of the wiper arm 12 (the arrow A direction and the arrow B direction in FIG. 6) being the axial direction.

The clip 36 is disposed at the inner side of the above-described arm side connecting portion 20, and is fixed to the arm side connecting portion 20. Concretely, a pair of fit-together projections 36A, that are fit-together with the fixing grooves 20A of the arm side connecting portion 20, are formed at the clip 36, and, due thereto, the clip 36 rotates integrally in the arm vertical direction with the wiper arm 12 and with respect to the wiper blade 30. Moreover, a lock portion 36B, that is fit-together with the fixing hole 20B of the arm side connecting portion 20, is formed at the clip 36. This lock portion 36B is structured so as to be elastically displaceable in the arm vertical direction, and a fit-together convex portion of the lock portion 36B is fit-together with the interior of the fixing hole 20B of the arm side connecting portion 20. Due thereto, relative movement of the wiper blade 30 with respect to the wiper arm 12 in the length direction of the wiper arm 12 is limited.

Further, as shown in FIG. 3, a fin 38 is provided at the upper portion of the wiper blade 30, and the fin 38 is formed integrally with the aforementioned holding case. As seen from the length direction of the wiper blade 30, the upper surface of this fin 38 is so as to be inclined toward the arm upper side while heading from the transverse direction other side toward the transverse direction one side of the wiper blade 30. Due thereto, there is a structure in which the fin 38 receives the traveling wind that arises while the vehicle is traveling, and pushes the wiper blade 30 toward the windshield glass WG side.

(Regarding the Main Nozzle 40)

As shown in FIG. 6, the main nozzle 40 is provided at the distal end portion of the wiper arm 12 (the arm main body portion 14), and is disposed at the arm base end side with respect to the clip 36. The main nozzle 40 is manufactured from a resin material (in the present embodiment, a fluorine resin) that is water repellent. Further, the main nozzle 40 has a nozzle main body portion 42, and the nozzle main body portion 42 is disposed at the transverse direction outer side of the wiper arm 12 (the arm main body portion 14). Concretely, the nozzle main body portion 42 is made to abut the outer side surface of the side wall portion 14B that is at the transverse direction one side of the arm main body portion 14, and, in the mounted state, covers the insert-through hole 22 of the side wall portion 14B from the transverse direction one side of the wiper arm 12. Due thereto, the nozzle main body portion 42 is disposed at the transverse direction one side of the wiper arm 12 with respect to (the fin 38 of) the wiper blade 30. Further, the nozzle main body portion 42 is formed substantially in the shape of a rectangular parallelepiped that extends in the length direction of the wiper arm 12. Concretely, as shown in FIG. 7 through FIG. 10, the nozzle main body portion 42 has a lower surface 42A that serves as a "facing surface" that is disposed so as to face the windshield glass WG in the arm vertical direction. Further, an outer side surface 42B of the nozzle main body portion 42 is inclined slightly toward the arm main body portion 14 side while heading toward the arm upper side.

Moreover, at the portion, that is at the arm base end side, of the nozzle main body portion 42, a recessed portion 43 that is recessed one step in toward the arm main body portion 14 side is formed. The recessed portion 43 is formed in a substantially inverted triangle shape as seen in side view (as seen from the transverse direction one side of the wiper arm 12), and opens toward the arm upper side and the arm base end side. Further, the portion, that is connected to the outer side surface 42B, at the recessed portion 43 is an inclined surface 42C. This inclined surface 42C is inclined toward the arm lower side while heading toward the arm base end side as seen in a side view. Further, as seen from the arm upper side, the transverse dimension of the inclined surface 42C is set so as to become smaller toward the arm distal end side, and the inclined surface 42C is formed in a substantially triangular shape such that the end portion, that is at the arm distal end side, of the inclined surface 42C is the apex. Further, the inclined surface 42C and the lower surface 42A intersect as seen in side view, and the portion, that is at the arm lower side and the arm base end side, of the nozzle main body portion 42 is formed in a substantial wedge shape (see FIG. 7). Moreover, the side surface, that is at the arm distal end side, of the nozzle main body portion 42 is a side surface 42D.

Figure 11:
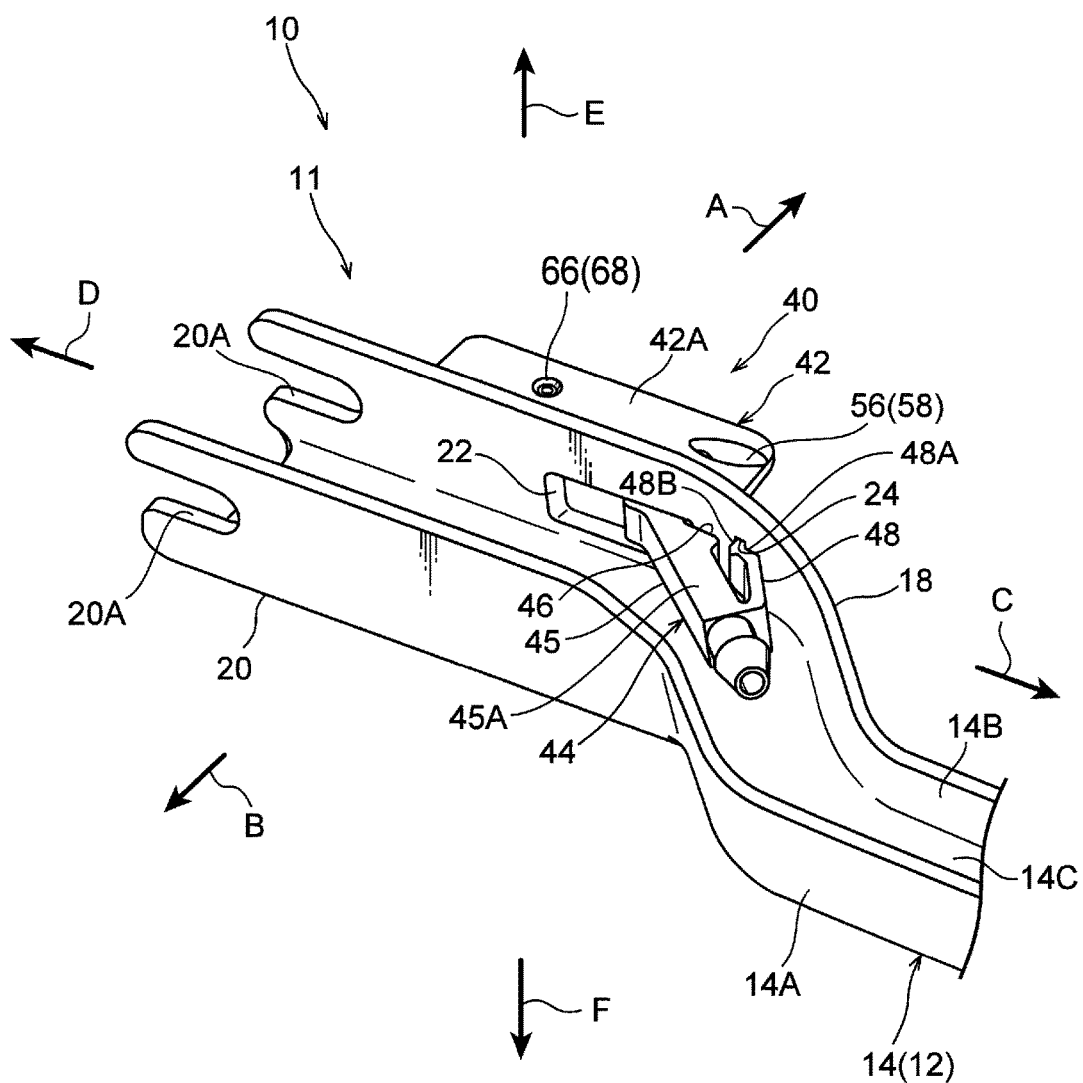
FIG. 11 is a perspective view that is seen from the arm lower side and that shows a state in which the washer nozzle is assembled to the distal end portion of the wiper arm shown in FIG. 6.

Further, as shown in FIG. 11, the main nozzle 40 has the nozzle connecting portion 44. The nozzle connecting portion 44 is formed in a substantial tube shape, and projects-out from the nozzle main body portion 42 toward the transverse direction inner side of the wiper arm 12 (in detail, the transverse direction other side of the wiper arm 12). Concretely, as seen from the arm lower side, the nozzle connecting portion 44 is inclined toward the arm base end side while heading toward the transverse direction inner side of the wiper arm 12. Further, the nozzle connecting portion 44 is inserted-through the interior of the insert-through hole 22 of the side wall portion 14B, and is disposed at the inner side of the arm main body portion 14, and extends from the nozzle main body portion 42 so as to run along the transversely bent portion 18 of the wiper arm 12.

Further, the portion at the base end side of the nozzle connecting portion 44 is a connecting main body portion 45. The outer shape of the connecting main body portion 45, as seen from the axial direction of the nozzle connecting portion 44, is formed in a substantially rectangular shape. Concretely, an upper surface 45A and a lower surface 45B (see FIG. 10) of the connecting main body portion 45 are disposed along a direction that is orthogonal to the arm vertical direction. Further, the vertical dimension of the connecting main body portion 45 (a distance between the upper surface 45A and the lower surface 45B) is set to be slightly small as compared with a vertical dimension of the insert-through hole 22 at the side wall portion 14B. In the arm vertical direction, the upper surface 45A of the connecting main body portion 45 and the inner peripheral surface at the upper side of the insert-through hole 22 are disposed so as to face one another, and the lower surface 45B of the connecting main body portion 45 and the inner peripheral surface at the lower side of the insert-through hole 22 are disposed so as to face one another. Due thereto, relative movement of the main nozzle 40 with respect to the wiper arm 12 in the arm vertical direction is limited.

Figure 8:
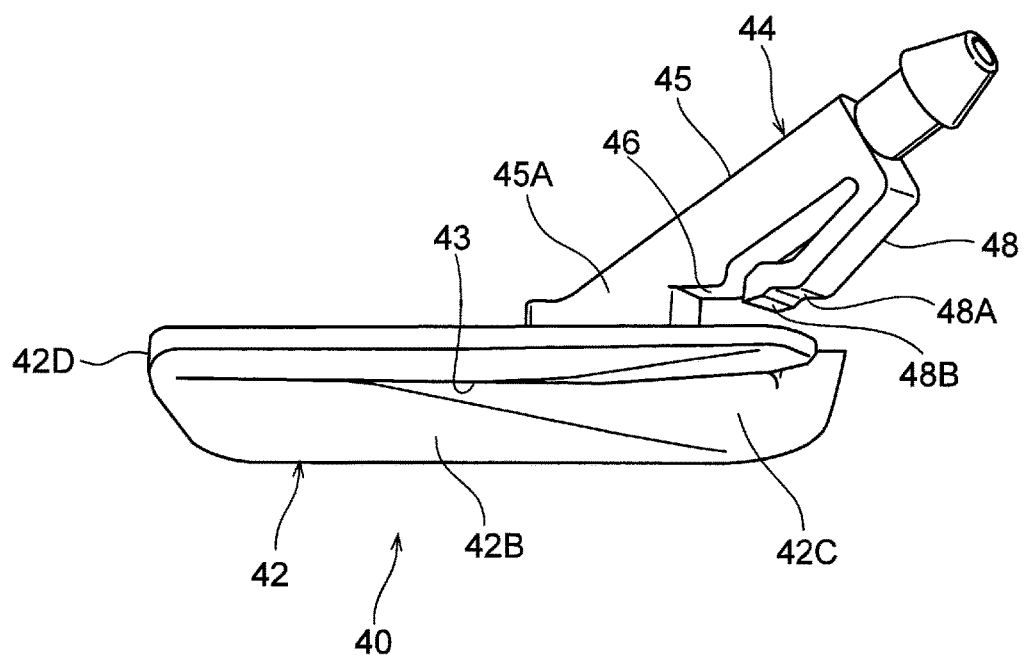
FIG. 8 is a perspective view in which the washer nozzle shown in FIG. 6 is seen from the arm upper side.
Figure 9:
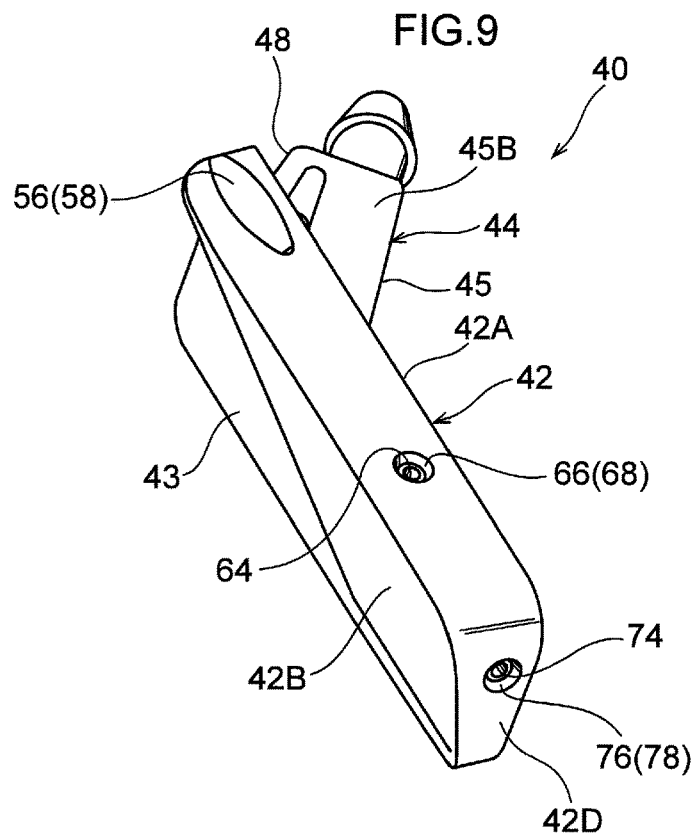
FIG. 9 is a perspective view in which the washer nozzle shown in FIG. 6 is seen from an arm distal end lower side.
Figure 10:
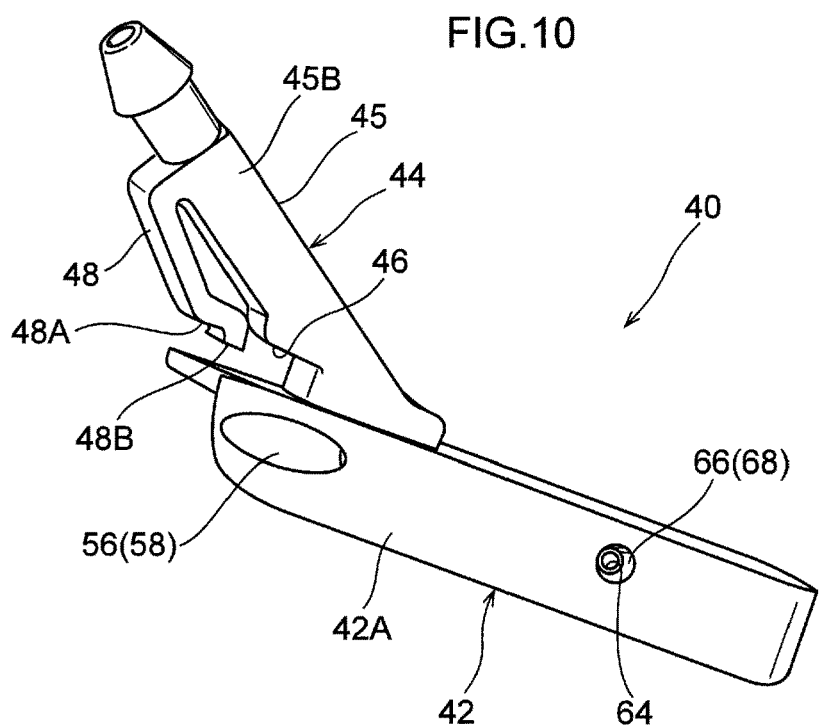
FIG. 10 is a perspective view in which the washer nozzle shown in FIG. 6 is seen from the arm lower side.

Moreover, as shown in FIG. 8 and FIG. 10, a slit 46 is formed in the main nozzle 40 between the base end portion of the connecting main body portion 45 and the nozzle main body portion 42. The slit 46 opens toward the arm base end side, and passes-through in the arm vertical direction. Further, a width dimension of the slit 46 is set to be slightly large as compared with a plate thickness dimension of the side wall portion 14B, and the edge portion of the insert-through hole 22 at the side wall portion 14B is disposed within the slit 46. Due thereto, the side wall portion 14B is nipped-in by the nozzle connecting portion 44 and the nozzle main body portion 42, and relative movement of the main nozzle 40 with respect to the wiper arm 12 in the transverse direction of the wiper arm 12 is limited (see FIG. 11).

The engaging hook 48 that serves as an "engaging portion" is formed integrally at the distal end portion of the connecting main body portion 45, at the portion that faces the side wall portion 14B of the transversely bent portion 18. This engaging hook 48 extends once from the distal end portion of the connecting main body portion 45 toward the side wall portion 14B side of the arm main body portion 14, and is bent toward the base end side of the connecting main body portion 45 (see FIG. 11) such that the plate thickness direction substantially coincides with the plate thickness direction of the side wall portion 14B.

Moreover, a bent portion 48A is formed at the distal end portion of the engaging hook 48, and the bent portion 48A is bent toward the arm distal end side. Moreover, a hook portion 48B is formed at the distal end portion of the bent portion 48A, and the hook portion 48B is bent toward the nozzle main body portion 42 side (the transverse direction one side of the wiper arm). Further, as shown in FIG. 11, the engaging hook 48 is structured so as to be elastically deformable in the plate thickness direction of the side wall portion 14B, and the hook portion 48B is inserted within the engaging hole 24 of the arm main body portion 14 in a state in which the engaging hook 48 is elastically deformed. Concretely, the bent portion 48A is made to abut the inner side surface of the side wall portion 14B, and the distal end portion of the engaging hook 48 is pushed by the side wall portion 14B toward the transverse direction other side of the wiper arm. Due thereto, the engaging hook 48 and the engaging hole 24 engage in the length direction of the wiper arm 12, and relative movement of the main nozzle 40 with respect to the wiper arm 12 in the length direction of the wiper arm 12 is limited.

Figure 1:
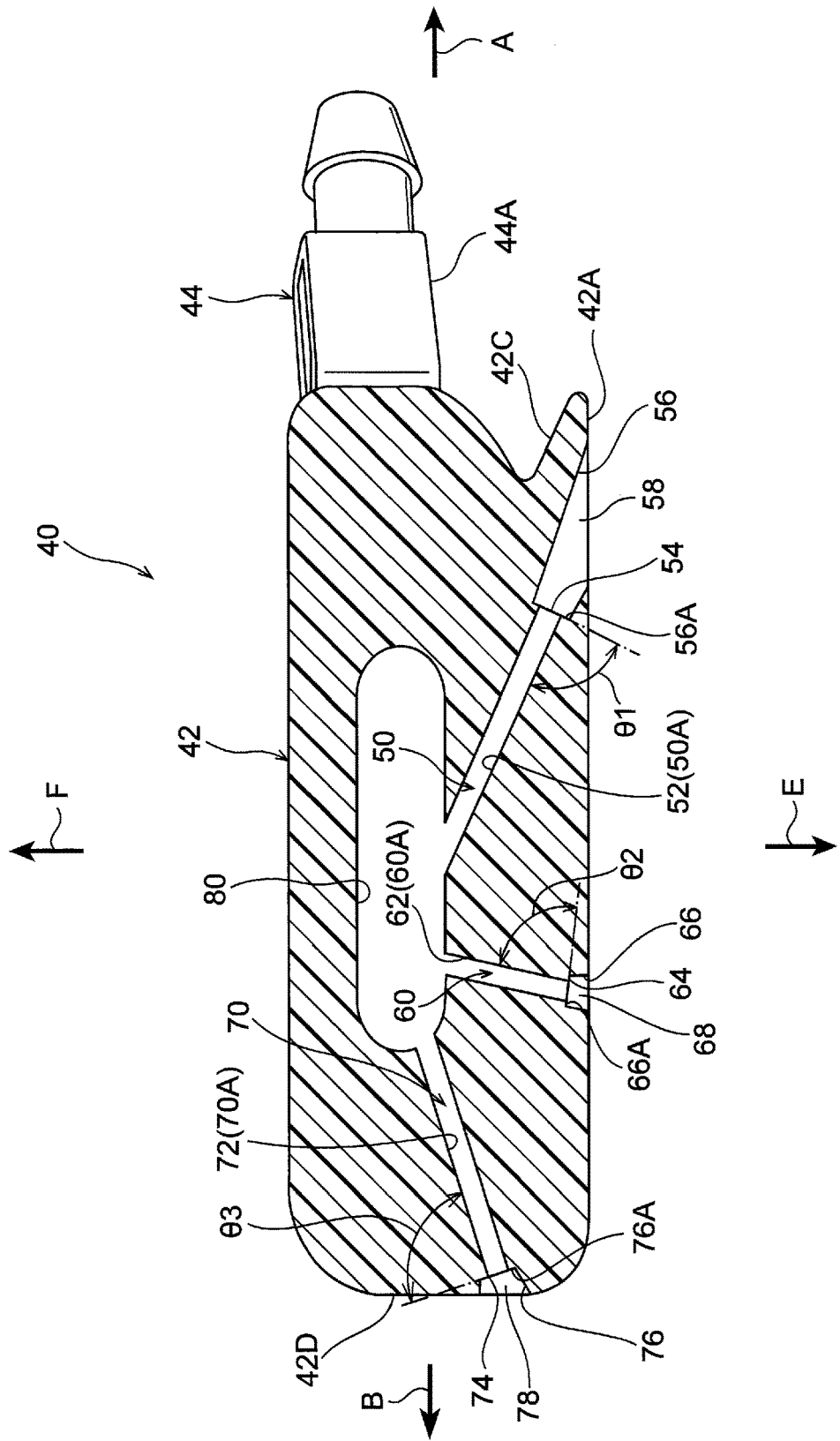
FIG. 1 is a side sectional view showing the interior of a washer nozzle according to a first embodiment.

On the other hand, as shown in FIG. 1, a branching portion 80 is formed at the interior of the nozzle main body portion 42, at the substantially central portion. The branching portion 80 communicates with the interior (the flow path) of the nozzle connecting portion 44. Further, a first flow path 50, a second flow path 60 and a third flow path 70 that serve as "flow paths" at three places are formed at the interior of the nozzle main body portion 42, and these first flow path 50, second flow path 60 and third flow path 70 respectively communicate with the branching portion 80. Due thereto, the washing liquid that has been supplied to the nozzle connecting portion 44 is, via the first flow path 50, the second flow path 60 and the third flow path 70, jetted-out from the nozzle main body portion 42. This is described concretely hereinafter.

The first flow path 50 is disposed at the arm distal end side with respect to the inclined surface 42C of the nozzle main body portion 42. In other words, the inclined surface 42C is disposed at the arm base end side with respect to the first flow path 50. This first flow path 50 is formed in a circular shape in cross-section, and extends in a rectilinear form from the branching portion 80 toward the windshield glass WG side (the lower surface 42A side of the nozzle main body portion 42) as seen in a side cross-section (FIG. 1) that is a length direction cross-section of the nozzle main body portion 42. Concretely, the first flow path 50 is formed so as to be inclined toward the arm base end side while heading toward the arm lower side (the windshield glass WG side) as seen in a side sectional view. Further, an inner peripheral surface 50A of the first flow path 50 is a first water repellent portion 52 that serves as a "water repellent portion". Further, because the main nozzle 40 is manufactured from a fluorine resin as described above, the first water repellent portion 52 also is structured by a resin material (a fluorine resin) that is water repellent.

On the other hand, a first concave portion 56 that serves as a "concave portion" is formed at the lower surface 42A of the nozzle main body portion 42 at a position corresponding to the first flow path 50. The first concave portion 56 opens toward the arm lower side (is formed so as to open facing the windshield glass WG such that the opening of the first concave portion 56 does not face the arm base end side), and communicates with the first flow path 50. Further, the depth direction of the first concave portion 56 coincides with the length direction of the first flow path 50, and the cross-section of the first concave portion 56 as seen from the length direction of the first flow path 50 is formed in a circular shape that is a concentric circular shape with the first flow path 50. Namely, the central axis of the first flow path 50 and the central axis of the first concave portion 56 coincide. Further, the opening portion of the first flow path 50, that is formed at a bottom surface 56A of the first concave portion 56, is a first main jetting hole 54 that serves as a "jetting hole", and the internal space of the first concave portion 56 is a first area 58. Due thereto, the first main jetting hole 54 is provided at the lower surface 42A via the first concave portion 56.

Further, the bottom surface 56A of the first concave portion 56 is disposed along a direction orthogonal to the length direction of the first flow path 50. Namely, angle θ1, that is formed by the inner peripheral surface 50A (the first water repellent portion 52) of the first flow path 50 and the bottom surface 56A as seen in a side sectional view, is set to be 90°, and the angle θ1 is set to be constant in the peripheral direction of the first main jetting hole 54.

Further, the sectional surface area of the first concave portion 56 as seen from the length direction (the extending direction) of the first flow path 50 is set so as to become larger toward the opening side (the windshield glass WG side) of the first concave portion 56. Namely, the first concave portion 56 is formed so as to become wider toward the windshield glass WG side (the lower surface 42A side of the nozzle main body portion 42).

The second flow path 60 is disposed at the arm distal end side with respect to the first flow path 50, and extends in a rectilinear form from the branching portion 80 substantially toward the arm lower side (the lower surface 42A side of the nozzle main body portion 42). Concretely, as seen in a side sectional view, the second flow path 60 is formed so as to be inclined slightly toward the arm distal end side while heading from the branching portion 80 toward the arm lower side. Further, the second flow path 60 is formed in a circular shape in cross-section, and the diameter dimension of the second flow path 60 is set so as to be the same dimension as the diameter dimension of the first flow path 50. Further, an inner peripheral surface 60A of the second flow path 60 is a second water repellent portion 62 that serves as a "water repellent portion", and the second water repellent portion 62 is structured by a resin material (i.e., a fluorine resin) that is water repellent.

Further, a second concave portion 66 that serves as a "concave portion" is formed at the lower surface 42A of the nozzle main body portion 42 in correspondence with the second flow path 60, and the second flow path 60 communicates with the second concave portion 66. This second concave portion 66 is structured similarly to the first concave portion 56. Namely, the second concave portion 66 is formed such that the depth direction thereof is the length direction of the second flow path 60, and opens toward the windshield glass WG side. Further, a second main jetting hole 64 that serves as a "jetting hole" is formed at a bottom surface 66A of the second concave portion 66, and the second main jetting hole 64 opens toward the lower surface 42A side of the nozzle main body portion 42 (i.e., the windshield glass WG side). Due thereto, the second main jetting hole 64 is provided at the lower surface 42A via the second concave portion 66. Further, the cross-section of the second concave portion 66 as seen from the length direction of the second flow path 60 is formed in a circular shape that is a concentric circular shape with the second flow path 60. Moreover, the bottom surface 66A of the second concave portion 66 is disposed along a direction orthogonal to the length direction of the second flow path 60, and angle θ2, that is formed by the inner peripheral surface 60A (the second water repellent portion 62) of the second flow path 60 and the bottom surface 66A, is set to be constant (90°) in the peripheral direction of the second main jetting hole 64. Further, the internal space of the second concave portion 66 is a second area 68.

The third flow path 70 is disposed at the arm distal end side with respect to the second flow path 60, and extends in a rectilinear form from the branching portion 80 toward the arm distal end side (the side surface 42D side of the nozzle main body portion 42). Concretely, as seen in a side sectional view, the third flow path 70 is formed so as to be inclined toward the arm lower side while heading from the branching portion 80 toward the arm distal end side. Further, the third flow path 70 is formed in a circular shape in cross-section, and the diameter dimension of the third flow path 70 is set so as to be the same dimension as the diameter dimension of the first flow path 50. Further, an inner peripheral surface 70A of the third flow path 70 is a third water repellent portion 72 that serves as a "water repellent portion", and the third water repellent portion 72 is structured by a resin material (a fluorine resin) that is water repellent.

Further, a third concave portion 76 that serves as a "concave portion" is formed at the side surface 42D of the nozzle main body portion 42 in correspondence with the third flow path 70, and the third flow path 70 communicates with the third concave portion 76. This third concave portion 76 is structured similarly to the first concave portion 56. Namely, the third concave portion 76 is formed such that the depth direction thereof is the length direction of the third flow path 70, and opens toward the arm distal end side. Further, a third main jetting hole 74 that serves as a "jetting hole" is formed at a bottom surface 76A of the third concave portion 76, and the third main jetting hole 74 opens toward the side surface 42D side of the nozzle main body portion 42, and opens toward the windshield glass WG side. Further, the cross-section of the third concave portion 76 as seen from the length direction of the third flow path 70 is formed in a circular shape that is a concentric circular shape with the third flow path 70. Moreover, the bottom surface 76A of the third concave portion 76 is disposed along a direction orthogonal to the length direction of the third flow path 70, and angle θ3, that is formed by the inner peripheral surface 70A (the third water repellent portion 72) of the third flow path 70 and the bottom surface 76A, is set to be constant (90°) in the peripheral direction of the third main jetting hole 74. Further, the internal space of the third concave portion 76 is a third area 78.

Further, as shown in FIG. 4, a first hose 90 for the main nozzle that serves as a "hose" is connected to the distal end portion of the nozzle connecting portion 44 of the main nozzle 40. The nozzle connecting portion 44 is connected to a first washer pump (not shown) of the vehicle via the first hose 90 for the main nozzle, a first hose joint 92, and a second hose 94 for the main nozzle. Due thereto, washing liquid, that is fed under pressure by the first washer pump from a washer tank (not shown) of the vehicle, is supplied to the nozzle connecting portion 44 of the main nozzle 40.

Figure 14A:
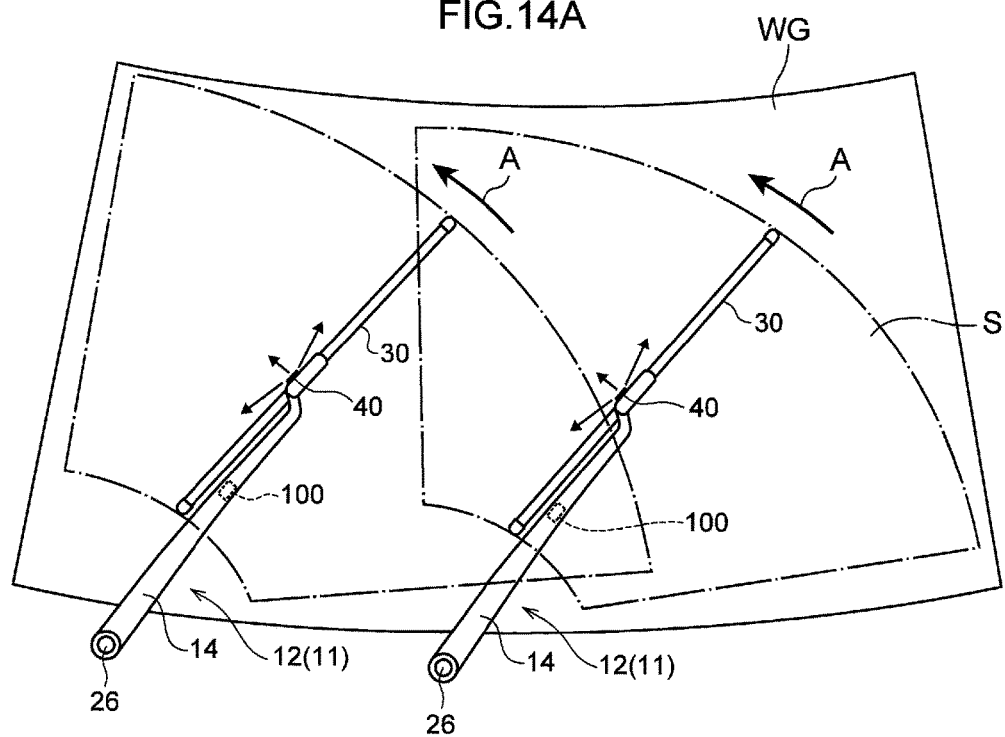
FIG. 14A is a plan view showing a state in which wiper blades shown in FIG. 2 are in the midst of being rotated toward a rotation direction one side.

Further, as shown in FIG. 14A, when the wiper arm 12 rotates toward the rotating direction one side, the washing liquid that is supplied to the nozzle connecting portion 44 is jetted-out toward the windshield glass WG via the branching portion 80 and by the first main jetting hole 54, the second main jetting hole 64 and the third main jetting hole 74. Concretely, the washing liquid that is jetted-out from the first main jetting hole 54 is jetted-out from the first main jetting hole 54 toward the arm base end side while heading toward the arm lower side, and passes-through the first area 58 that is within the first concave portion 56, and lands on the windshield glass WG Further, the washing liquid that is jetted-out from the second main jetting hole 64 is jetted-out from the second main jetting hole 64 toward the arm lower side, and passes-through the second area 68 that is within the second concave portion 66, and lands on the windshield glass WG. Moreover, the washing liquid that is jetted-out from the third main jetting hole 74 is jetted-out from the third main jetting hole 74 toward the arm lower side while heading toward the arm distal end side, and passes-through the third area 78 that is within the third concave portion 76, and lands on the windshield glass WG (refer to the arrows in FIG. 14A).

Next, the assembly processes at the time of assembling the main nozzle 40 to the wiper arm 12 are described. When the main nozzle 40 is to be assembled to the distal end portion of the wiper arm 12, the main nozzle 40 is placed at the transverse direction one side of the arm side connecting portion 20 of the arm main body portion 14. Concretely, the main nozzle 40 is placed such that the insert-through hole 22, that is formed in the side wall portion 14B of the arm main body portion 14, and the nozzle connecting portion 44 of the main nozzle 40, face one another in the transverse direction of the arm main body portion 14.

Then, the main nozzle 40 is moved toward the transverse direction other side of the arm main body portion 14 (the arrow B direction side in FIG. 11), and the nozzle connecting portion 44 is inserted within the insert-through hole 22, and the nozzle main body portion 42 is made to abut the outer side surface of the side wall portion 14B. In this state, the main nozzle 40 is slid toward the length direction one side of the arm main body portion 14 (the arrow C direction side in FIG. 11), and the edge portion of the insert-through hole 22 at the side wall portion 14B is inserted into the slit 46 of the main nozzle 40. At this time, the hook portion 48B of the engaging hook 48, that is formed integrally with the nozzle connecting portion 44, abuts the inner side surface of the side wall portion 14B, and the engaging hook 48 elastically deforms toward the transverse direction other side of the arm main body portion 14. Then, due to the main nozzle 40 being slid further toward the length direction one side of the arm main body portion 14, the hook portion 48B of the engaging hook 48 is inserted within the engaging hole 24 of the side wall portion 14B. Due thereto, the engaging hook 48 and the engaging hole 24 are engaged, and the main nozzle 40 is assembled to the arm main body portion 14. Further, at the time of this state, the bent portion 48A of the engaging hook 48 is made to abut the inner side surface of the side wall portion 14B, and the engaging hook 48 elastically deforms in its own plate thickness direction.

In this way, at the wiper arm 11 equipped with a nozzle, the engaging hook 48 of the main nozzle 40 is made to engage with the engaging hole 24 due to the nozzle connecting portion 44 (the main nozzle 40) being slid toward the length direction one side of the wiper arm 12 in the state in which the nozzle connecting portion 44 of the main nozzle 40 is inserted-through the interior of the insert-through hole 22 of the side wall portion 14B.

(Regarding the Sub-Nozzle 100)

As shown in FIG. 3 and FIG. 4, the sub-nozzle 100 is disposed at the inner side of the length direction intermediate portion of the arm main body portion 14. Concretely, the sub-nozzle 100 is disposed at the inner side of the arm main body portion 14 so as to correspond to the end portion at the base end side of the wiper blade 30. This sub-nozzle 100 is formed substantially in the shape of a cylindrical tube having a bottom, and the sub-nozzle 100 has a sub-nozzle connecting portion 101 (see FIG. 3). Further, a pair of sub jetting holes 102A, 102B (see FIG. 4) are formed at the sub-nozzle 100. The sub jetting holes 102A, 102B are disposed so as to be lined-up in the length direction of the wiper arm 12, and communicate with the sub-nozzle connecting portion 101.

Further, as shown in FIG. 4, the sub-nozzle connecting portion 101 of the sub-nozzle 100 is connected to a second washer pump (not illustrated) of the vehicle via a first hose 104 for the sub-nozzle, a second hose joint 106 and a second hose 108 for the sub-nozzle. Due thereto, washing liquid, that is fed under pressure by the second washer pump from the washer tank (not shown) of the vehicle, is supplied to the sub-nozzle 100.

Figure 14B:
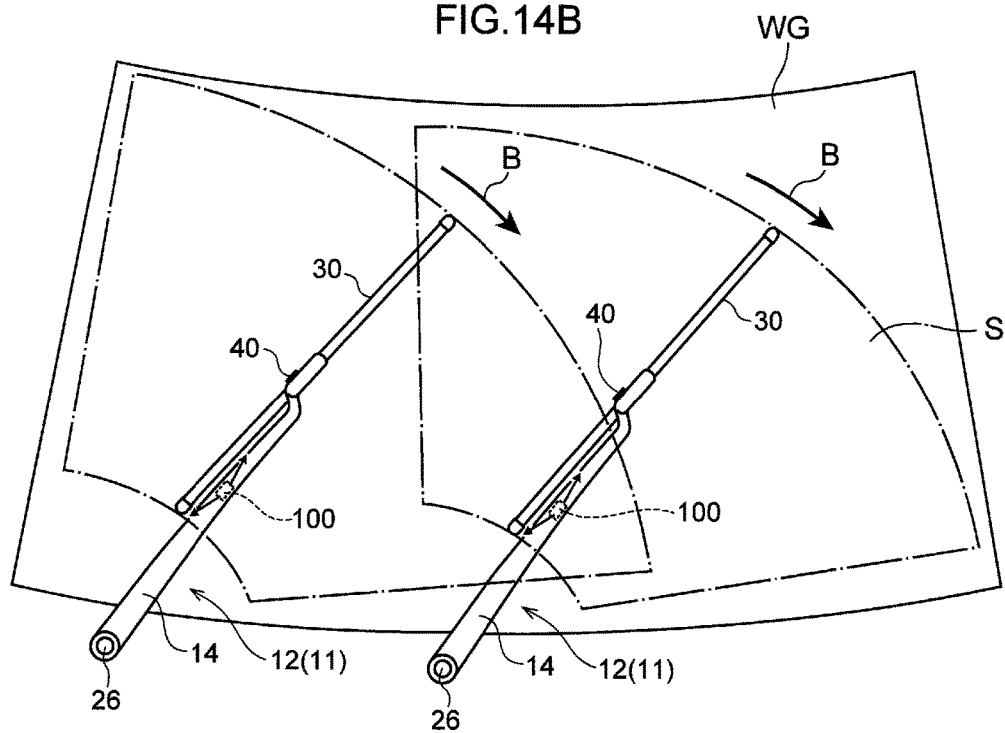
FIG. 14B is a plan view showing a state in which the wiper blades shown in FIG. 2 are in the midst of being rotated toward a rotation direction other side.

Further, as shown in FIG. 14B, the washing liquid that is supplied to the sub-nozzle 100 is jetted-out toward the windshield glass WG by the pair of sub jetting holes 102A, 102B. Concretely, when the wiper blade 30 is being rotated toward the return side (the arrow B direction in FIG. 14B) of the reciprocal rotation of the wiper blade 30, washing liquid is jetted-out toward the arm distal end side from the sub jetting hole 102A that is disposed at the arm distal end side, and washing liquid is jetted-out toward the arm base end side from the sub jetting hole 102B that is disposed at the arm base end side, and the washing liquid lands at the aforementioned return side of the wiper blade 30 and further toward the base end side than the length direction intermediate portion (refer to the arrows in FIG. 14B).

(Electrical Structure of Vehicle Wiper Device 10)

The electrical structure of the vehicle wiper device 10, that is structured as described above, is described next by using FIG. 12.

The vehicle wiper device 10 has a wiper switch sw1 and the wiper motor WM. Further, due to the wiper switch sw1 being turned ON, the wiper motor WM is driven, and the pivot shaft 26 (see FIG. 2) is rotated. This wiper switch sw1 has a "+B terminal", an "S terminal", a "+1 terminal" and a "+2 terminal", and the "+B terminal" is connected to the battery of the vehicle.

The wiper motor WM has a brush for high speed, a brush for low speed, and a common brush that is used in common for low speed and high speed, in order to correspond to a high speed mode in which the wiper motor WM operates the vehicle wiper device 10 at a high speed and a low speed mode in which the wiper motor WM operates the vehicle wiper device 10 at a low speed. Further, the positive electrode terminal that is connected to the brush for low speed of the wiper motor WM is connected to the "+1 terminal" of the wiper switch sw1, and the positive electrode terminal that is connected to the brush for high speed is connected to the "+2 terminal". Further, the negative electrode terminal that is connected to the common brush of the wiper motor WM is grounded to GND.

A cam switch csw is provided at the wiper motor WM in correspondence with the wiping position of the wiper blade 30. Further, this is a structure in which, even if the wiper switch sw1 is turned OFF in the state in which the wiper blade 30 is positioned at other than the stopped position, the wiper blade 30 returns to the stopped position due to the cam switch csw.

The cam switch csw has an "a contact", a "b contact", a "c contact", a "d contact" and a cam plate cp. The "a contact" is connected to the "+B terminal" of the wiper switch sw1, and the "b contact" is grounded to the negative electrode terminal of the wiper motor WM and to GND. Further, the "c contact" is connected to the "S terminal" of the wiper switch sw1, and the "d contact" is connected to a coil L of a relay of a washer system that is described later.

Figure 12:
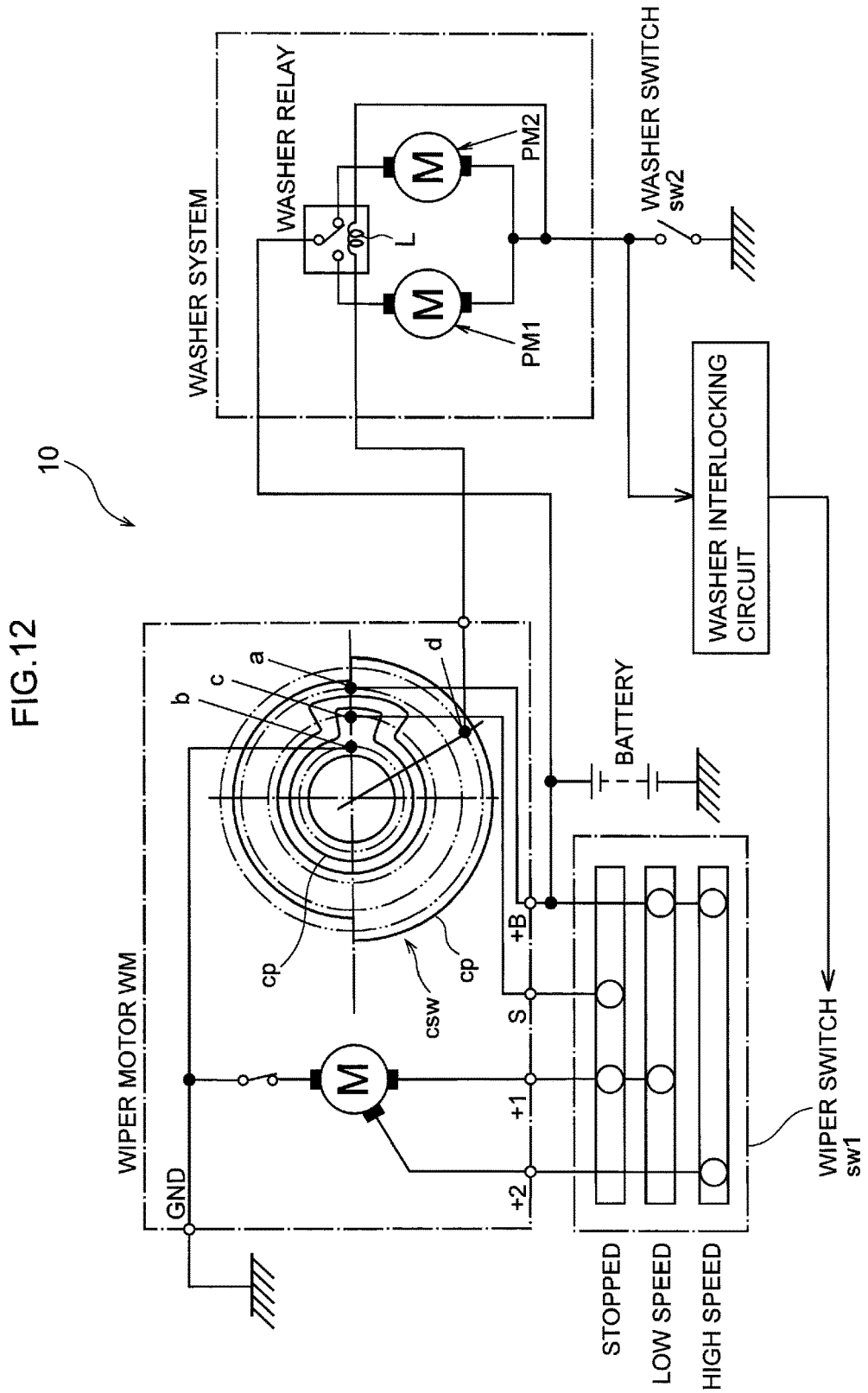
FIG. 12 is a circuit diagram showing the electrical structure of the vehicle wiper device shown in FIG. 2.

The cam plate cp is structured so as to rotate integrally with a worm wheel (not illustrated) that is connected to the output shaft of the wiper motor WM. When the wiper motor 30 moves reciprocally once between the stopped position and the reversing position, the cam plate cp rotates once. Note that FIG. 12 shows a state in which the wiper blade 30 is disposed at the stopped position. Further, due to the wiper motor WM being driven, the cam plate cp rotates, and the "c contact" is connected to either one of the "b contact" or the "a contact" by the cam plate cp. Concretely, when the wiper blade 30 is at other than the stopped position, the "c contact" is connected to the "a contact". Due thereto, even if the wiper switch sw1 is turned OFF at a time when the wiper blade 30 is at other than the stopped position, driving current is supplied to the wiper motor WM via the cam switch csw. Further, when the wiper blade 30 is rotated to the stopped position, the "c contact" is connected to the "b contact". Due thereto, there is a structure in which the brush for low speed and the common brush of the wiper motor WM become a closed circuit at GND potential, and the wiper motor WM is stopped at the stopped position.

Further, the vehicle wiper device 10 has a washer system, and the washer system has a first washer pump motor PM1 that drives the first washer pump, and a second washer pump motor PM2 that drives the second washer pump. Respective one ends of the first washer pump motor PM1 and the second washer pump motor PM2 are grounded to GND via a washer switch sw2. Further, either one of the other ends of the first washer pump motor PM1 and the second washer pump motor PM2 is connected to the battery of the vehicle by a switching contact of a washer relay.

Further, the wiper switch sw1 is connected, via a washer interlocking circuit, between the first washer pump motor PM1 and the second washer pump motor PM2 and the washer switch sw2. Due thereto, when the washer switch sw2 is turned on, the wiper operates due to the wiper relay within the washer interlocking circuit.

Further, on the basis of whether or not the cam plate cp is connected to the "d contact", a coil L of the washer relay of the washer system operates, and current is supplied alternatively to either one of the first washer pump motor PM1 and the second washer pump motor PM2.

Figure 13:
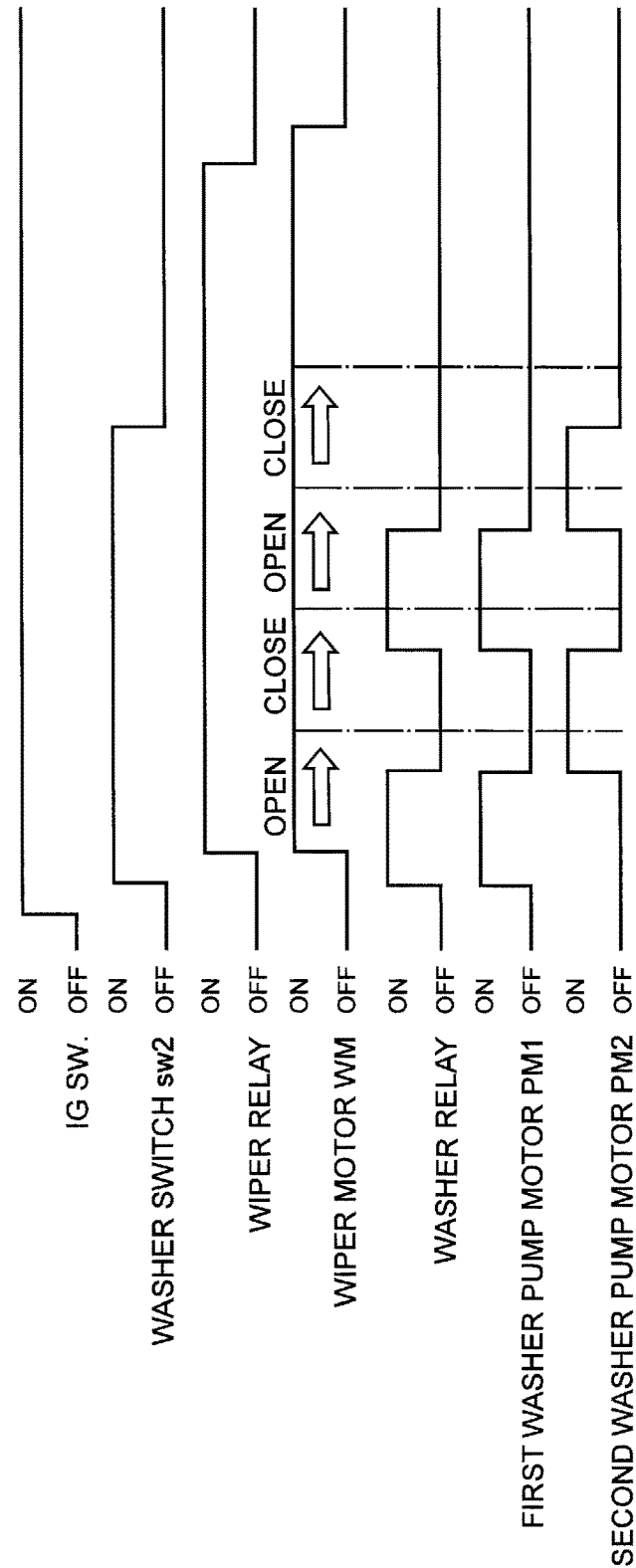
FIG. 13 is a timing chart showing switching times of the vehicle wiper device shown in FIG. 2.

Concretely, as shown in the timing chart of FIG. 13, when the washer switch sw2 is turned ON in a state in which an ignition switch (IG SW) of the vehicle is ON, because the wiper blade 30 is at the stopped position (the state shown in FIG. 2), the cam plate cp is connected to the "d contact", and the first washer pump motor PM1 is turned ON by the washer relay. Then, the wiper motor WM is turned ON by the switching means such as the wiper relay and the like within the washer interlocking circuit, and the wiper blade 30 is rotated from the stopped position toward the reversing position (is moved in the going direction). Note that, in FIG. 13, the state in which the wiper blade 30 is being rotated toward the rotating direction one side (is being moved in the going direction) is marked as "OPEN", and the state in which the wiper blade 30 is being rotated toward the rotating direction other side (is being moved in the returning direction) is marked as "CLOSE".

Further, at the position before the wiper blade 30 reaches the reversing position (the position of switching from "OPEN" to "CLOSE"), driving is set so as to switch from driving of the first washer pump motor PM1 to driving of the second washer pump motor PM2 by the washer relay. Hereinafter, this switching position is called the "upper switching position", and the position of the wiper blade 30 at this time corresponds to the position shown by the one-dot chain line in FIG. 2.

On the other hand, when the wiper blade 30 is rotated from the reversing position toward the stopped position (is moved in the returning direction), at the position before the wiper blade 30 reaches the stopped position (the position of switching from "CLOSE" to "OPEN"), driving is set so as to switch from driving of the second washer pump motor PM2 to driving of the first washer pump motor PM1 by the washer relay. Hereinafter, this switching position is called the "lower switching position", and the position of the wiper blade 30 at this time corresponds to the position shown by the one-dot chain line in FIG. 2.

Namely, as shown in FIG. 14A, washing liquid is jetted-out from the main nozzle 40 (refer to the arrows in FIG. 14A) until the wiper arm 12 is rotated toward the rotating direction one side and reaches the upper switching position. Then, at the upper switching position that is before the reversing position, driving is switched from driving of the first washer pump motor PM1 to driving of the second washer pump motor PM2, and washing liquid is jetted-out from the sub-nozzle 100.

On the other hand, as shown in FIG. 14B, washing liquid is jetted-out from the sub-nozzle 100 (refer to the arrows in FIG. 14B) until the wiper arm 12 is rotated from the reversing position toward the rotating direction other side and reaches the lower switching position. Then, at the lower switching position that is before the stopped position, driving is switched from driving of the second washer pump motor PM2 to driving of the first washer pump motor PM1, and washing liquid is jetted-out from the main nozzle 40.

Further, the region between the upper switching position and the lower switching position is a central wiping region CA (see FIG. 2), and a central position in the rotating direction at the central wiping region CA (the position that is equidistant from the stopped position and the reversing position) is rotation direction central position CL (see FIG. 2).

Operation and effects of the present embodiment are described next.

In the vehicle wiper device 10 that is structured as described above, the main nozzle 40 is provided at the distal end portion of the wiper arm 12, and the nozzle main body portion 42 of the main nozzle 40 projects-out toward the transverse direction one side (the rotating direction one side) of the wiper arm 12 with respect to the wiper arm 12. Further, the first flow path 50, the second flow path 60 and the third flow path 70 are formed at the interior of the nozzle main body portion 42. Further, the sub-nozzle 100 is provided at the length direction intermediate portion of the wiper arm 12.

Further, at the time when washing liquid is jetted-out onto (supplied to) the surface S to be wiped of the windshield glass WG, and the surface S is wiped by the wiper blade 30, the washer switch sw2 is turned ON. When the washer switch sw2 is turned ON, the washer switch sw1 is turned ON interlockingly with the washer switch sw2, and the wiper blade 30 is rotated together with the wiper arm 12 from the stopped position toward the rotating direction one side. At this time, the first washer pump motor PM1 is driven, and the washing liquid is jetted-out (supplied) from the main nozzle 40 toward the rotating direction one side with respect to the wiper blade 30.

Further, at the upper switching position, driving is switched from the driving of the first washer pump motor PM1 to the driving of the second washer pump motor PM2, and washing liquid is supplied from the sub-nozzle 100.

When the wiper blade 30 is further rotated from the upper switching position toward the rotating direction one side, the wiper blade 30 reverses at the reversing position, and is rotated toward the rotating direction other side. At this time, washing liquid is supplied from the sub-nozzle 100 toward the rotating direction other side with respect to the wiper blade 30. Further, at the lower switching position, driving is switched from the driving of the second washer pump motor PM2 to the driving of the first washer pump motor PM1, and washing liquid is supplied from the main nozzle 40.

When the wiper blade 30 is further rotated from the lower switching position toward the rotating direction other side, the wiper blade 30 reverses at the stopped position, and is rotated toward the rotating direction one side. Thereafter, the above-described reciprocal rotation of the wiper blade 30 is repeated a set, predetermined number of times.

Here, the first water repellent portion 52 that structures the inner peripheral surface 50A of the first flow path 50 at the main nozzle 40, the second water repellent portion 62 that structures the inner peripheral surface 60A of the second flow path 60, and the third water repellent portion 72 that structures the inner peripheral surface 70A of the third flow path 70 are structured of a material (a fluorine resin) that is water repellent. Because these respective water repellent portions 52, 62, 72 extend to the respective jetting holes 54, 64, 74, when liquid such as water or the like attempts to enter into the first flow path 50 (the second flow path 60, the third flow path 70) from the first main jetting hole 54 (the second main jetting hole 64, the third main jetting hole 74) against gravitational force, that liquid is repelled by the first water repellent portion 52 (the second water repellent portion 62, the third water repellent portion 72). Due thereto, even in a case in which the first main jetting hole 54 (the second main jetting hole 64, the third main jetting hole 74) of the main nozzle 40 is covered by liquid such as water or the like, the liquid being drawn-into the first flow path 50 (the second flow path 60, the third flow path 70) from the first main jetting hole 54 (the second main jetting hole 64, the third main jetting hole 74), and liquid remaining in the first main jetting hole 54 (the second main jetting hole 64, the third main jetting hole 74) region can be reduced or prevented.

Figure 15:
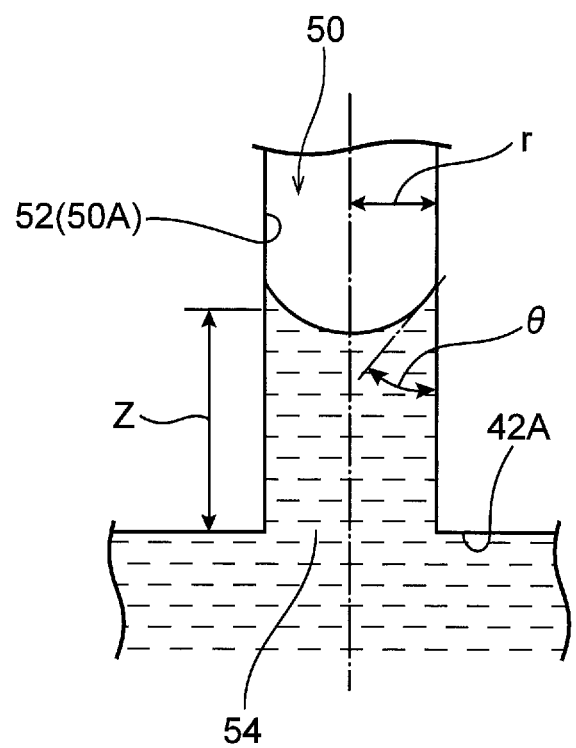
FIG. 15 is an explanatory drawing for explaining the principles of drawing-in liquid into a first flow path when a first jetting hole of the washer nozzle is covered by the liquid.

This point is described hereinafter by using FIG. 15. FIG. 15 is shown for explaining the principles of drawing-in of liquid into the first flow path 50 at the time when the first main jetting hole 54 of the first flow path 50 at the main nozzle 40 is covered by the liquid (water). Note that, in FIG. 15, illustration of the first concave portion 56 of the main nozzle 40 is omitted for convenience.

As shown in this drawing, when the first main jetting hole 54 of the first flow path 50 is covered by a liquid, because the diameters of the first flow path 50 and the first main jetting hole 54 are small, capillary action acts such that the liquid is drawn-into the first flow path 50 from the first main jetting hole 54 against gravitational force. A draw-in height of the liquid at this time (a raised height from the first main jetting hole 54) Z is determined by the following formula.

$$Z=(2\times T\times\cos\theta)/(\gamma\times r) \quad (1)$$

Here, T is the surface tension of the liquid, θ is the contact angle of the surface of the liquid and the inner peripheral surface 50A of the first flow path 50, γ is the specific weight of the liquid, and r is the radius of the first flow path 50.

Further, in the present embodiment, the inner peripheral surface 50A of the first flow path 50 is the first water repellent portion 52, and the first water repellent portion 52 is structured by a material (a fluorine resin) that is water repellent. Therefore, when the first main jetting hole 54 of the first flow path 50 is covered by a liquid (water), the aforementioned contact angle θ becomes greater than or equal to 90° (in detail, from 100° to) 110°). Due thereto, cos θ in above formula (1) is a value that is less than or equal to zero, and, even in a case in which the first main jetting hole 54 of the first flow path 50 is covered by a liquid (water), the liquid (water) being drawn-into the first flow path 50 from the first main jetting hole 54 and remaining at the jetting hole region can be reduced or prevented.

By structuring the first water repellent portion 52, the second water repellent portion 62 and the third water repellent portion 72 of the main nozzle 40 of a water repellent material in this way, liquid such as water or the like being drawn-into the first flow path 50 (the second flow path 60, the third flow path 70) from the first main jetting hole 54 (the second main jetting hole 64, the third main jetting hole 74) and remaining at the jetting hole region can be reduced or prevented. Due thereto, in cold geographical regions, the liquid such as water or the like, that remains at the jetting hole region, freezing and the first main jetting hole 54 (the second main jetting hole 64, the third main jetting hole 74) becoming blocked is decreased or prevented. As a result, a heater, for melting the liquid such as water or the like that has frozen at the first main jetting hole 54 (the second main jetting hole 64, the third main jetting hole 74) is not provided at the main nozzle 40 or at the wiper arm 12, and the washing liquid can be jetted-out from the first main jetting hole 54 (the second main jetting hole 64, the third main jetting hole 74). Even if liquid, that is of the extent of a thin water film, does remain and freezes, it can be blown-out and jetted-out together with the liquid due to the pressure of the jetting.

Further, as described above, because the first water repellent portion 52, the second water repellent portion 62 and the third water repellent portion 72 of the main nozzle 40 are structured of a fluorine resin, the respective coefficients of friction of the inner peripheral surface 50A of the first flow path 50, the inner peripheral surface 60A of the second flow path 60, and the inner peripheral surface 70A of the third flow path 70 can be structured to be relatively low. Due thereto, pressure loss of the washing liquid at the time when the washing liquid passes-through the first flow path 50 (the second flow path 60, the third flow path 70) interior can be reduced. As a result, the washing liquid can be jetted-out well from the main nozzle 40 toward the windshield glass WG.

Moreover, the first concave portion 56 (the second concave portion 66, the third concave portion 76) is formed at the main nozzle 40, and the first main jetting hole 54 (the second main jetting hole 64, the third main jetting hole 74) is formed at the bottom surface 56A of the first concave portion 56 (the bottom surface 56B of the second concave portion 66, the bottom surface 56B of the third concave portion 76). Further, the first concave portion 56, the second concave portion 66 and the third concave portion 76 are formed so as to become wider toward the respective opening sides thereof. Therefore, even in a case in which liquid drops stick to the outer surface of the nozzle main body portion 42, the liquid drops being transferred to the inner peripheral surface of the first concave portion 56 (the second concave portion 66, the third concave portion 76) against gravitational force and reaching the first main jetting hole 54 (the second main jetting hole 64, the third main jetting hole 74) can be prevented. Due thereto, ingress of liquid into the first flow path 50 (the second flow path 60, the third flow path 70) can be suppressed more.

Further, as described above, in accordance with the vehicle wiper device 10 of the present disclosure, in the form in which the main nozzle 40 is mounted to the wiper arm 12, freezing of liquid such as water or the like at the first main jetting hole 54 (the second main jetting hole 64, the third main jetting hole 74) of the main nozzle 40 can be decreased or prevented. Due thereto, there is no need to provide a heater at the main nozzle 40 or the wiper arm 12, and therefore, there is no need to harness a lead wire and the like for a heater at the wiper arm 12. Accordingly, this can contribute to a decrease in the cost of the vehicle wiper device 10 while suppressing complication of the structure of the wiper arm 12.

Moreover, the first main jetting hole 54 is provided via the first concave portion 56, and the second main jetting hole 64 is provided via the second concave portion 66, at the nozzle main body portion 42 so as to open at the lower surface 42A that faces in the thickness direction of the windshield glass WG. Namely, the first main jetting hole 54 and the second main jetting hole 64 are disposed at positions at which they can jet the washing liquid out efficiently with respect to the windshield glass WG. On the other hand, when the first main jetting hole 54 and the second main jetting hole 64 are disposed at such positions, because the lower surface 42A is disposed so as to face the windshield glass WG, it is easy for the first main jetting hole 54 and the second main jetting hole 64 to be covered by liquid that has stuck on the surface S to be wiped of the windshield glass WG, such as raindrops or the like that are to be wiped by the wiper blade 30. To address this, as described above, the first water repellent portion 52 and the second water repellent portion 62 of the main nozzle 40 are structured of a material that is water repellent, and therefore, even if the first main jetting hole 54 and the second main jetting hole 64 are covered by a liquid such as water or the like, freezing of the liquid such as water or the like at the first main jetting hole 54 and the second main jetting hole 64 can be decreased or prevented. Due thereto, while the first main jetting hole 54 and the second main jetting hole 64 are disposed at positions at which they can efficiently jet the washing liquid out with respect to the windshield glass WG, freezing of liquid such as water or the like at the first main jetting hole 54 and the second main jetting hole 64 can be decreased or prevented.

Further, the jetting holes at the three places (the first main jetting hole 54, the second main jetting hole 64 and the third main jetting hole 74) are provided at the main nozzle 40. Therefore, freezing of liquid such as water or the like at these jetting holes is decreased or prevented, and the washing liquid can be jetted-out in a wide range with respect to the windshield glass WG. Namely, if liquid such as water or the like were to freeze at the first main jetting hole 54, the second main jetting hole 64 and the third main jetting hole 74 of the main nozzle 40, the first main jetting hole 54, the second main jetting hole 64 and the third main jetting hole 74 would be blocked by the frozen ice or the like. At this time, it is thought that the respective jetting holes can be opened by operating an unillustrated washer switch of the vehicle, and operating the vehicle wiper device 10, and blowing the frozen ice or the like out by the pressure of the washing liquid. However, if one of the jetting holes is opened first, the washing liquid within the main nozzle 40 flows toward the opened jetting hole, and therefore, the pressure of the washing liquid within the main nozzle 40 drops, and the other jetting holes cannot be opened. Therefore, the washing liquid cannot be jetted-out from the main nozzle 40 in a wide range with respect to the windshield glass WG without opening all of the jetting holes at the main nozzle 40. To address this, in accordance with the present embodiment, even in a case in which jetting holes at three places are provided at the main nozzle 40 in order to jet the washing liquid out in a wide range with respect to the windshield glass WG, freezing of liquid such as water or the like at the respective jetting holes is decreased or prevented as described above. Therefore, freezing of liquid such as water or the like at the jetting holes (the first main jetting hole 54, the second main jetting hole 64, the third main jetting hole 74) is decreased or prevented, and the washing liquid can be jetted-out in a wide range with respect to the windshield glass WG.

Further, the inclined surface 42C that structures the outer peripheral portion of the nozzle main body portion 42 is disposed at the arm base end side with respect to the first main jetting hole 54, and the inclined surface 42C is inclined toward the arm lower side (the windshield glass WG side) while heading toward the arm base end side (is inclined at an upward slope while heading toward the arm distal end side) as seen from the transverse direction of the wiper arm 12. Therefore, in the operation of the vehicle wiper device 10 while the vehicle is traveling, the washing liquid that is jetted-out from the first through third main jetting holes 54, 64, 74 can be made to land at predetermined positions. This point is described hereinafter.

Namely, if the washer switch sw2 is turned ON while the vehicle is traveling, the traveling wind, that heads toward the vehicle rear side, flows at the side of the wiper arm 12 along the surface S of the windshield glass WG when the wiper arm 12 is rotated in a vicinity of the reversing position. Namely, because the length direction of the wiper arm 12 varies moment by moment in accordance with the wiping position and becomes a posture that is long in the longitudinal direction of the vehicle, airflow W1 (see FIG. 6) that flows from the arm base end side toward the arm distal end side arises at the side of the wiper arm 12.

At this time, when the airflow W1 flows-in between the windshield glass WG and the nozzle main body portion 42, the airflow W1 hits the washing liquid at the locus of jetting that is from the washing liquid being jetted-out from the first through third main jetting holes 54, 64, 74 until the washing liquid lands on the windshield glass WG, and there is the concern that the washing liquid will not be able to land at the predetermined positions. In particular, the washing liquid that is jetted-out from the first main jetting hole 54 is a jet that is directed from the first main jetting hole 54 toward the arm base end side while heading toward the arm lower side, and therefore, is easily affected by the aforementioned airflow W1.

To address this, at the main nozzle 40 of the present disclosure, as described above, the inclined surface 42C that structures the outer peripheral portion of the nozzle main body portion 42 is disposed at the arm base end side with respect to the first main jetting hole 54, and, as seen from the transverse direction of the wiper arm 12, the inclined surface 42C is inclined toward the arm lower side (the windshield glass WG side) while heading toward the arm base end side (is inclined at an upward slope while heading toward the arm distal end side). Therefore, when the airflow W1, that flows from the arm base end side toward the distal end side of the wiper arm 12, hits the nozzle main body portion 42, the airflow W1 is rectified by the inclined surface 42C, and the majority thereof flows along the inclined surface 42C toward the arm distal end side and the arm upper side (refer to airflow W2 in FIG. 6). Due thereto, the airflow W1 flowing-in between the windshield glass WG and the nozzle main body portion 42 is decreased, and the airflow W1 hitting the washing liquid that is jetted-out from the first through third main nozzle jetting holes 54, 64, 74 is decreased. Accordingly, the washing liquid can be jetted-out from the first through third main jetting holes 54, 64, 74 while the effects of the airflow W1, that flows at the side of the wiper arm 12 from the arm base end side toward the arm distal end side, are reduced. As a result, the washing liquid that is jetted-out from the first through third main jetting holes 54, 64, 74 can be made to land at predetermined positions. In particular, the jet from the first main jetting hole 54 is directed toward the arm base end side against the aforementioned airflow W1, but, because it is the decreased airflow W1, the washing liquid can be made to land at a predetermined position without being blown-back.

Further, the airflow W1 is rectified to become the airflow W2 by the inclined surface 42C that is inclined toward the arm lower side while heading toward the arm base end side as seen from the transverse direction of the wiper arm 12. Thus, the majority of the airflow W1 can be guided by the inclined surface 42C side (the arm upper side) as the rectified airflow W2. Therefore, as compared with a case in which the inclined surface 42C were to be inclined toward the wiper arm 12 side while heading toward the arm base end side as seen from the arm upper side, the airflow W1 flowing-in between the windshield glass WG and the nozzle main body portion 42 can be decreased. Accordingly, the effects of the airflow, that flows at the side of the wiper arm 12 from the arm base end side toward the arm distal end side, can be reduced effectively.

Further, as described above, the first concave portion 56 and the second concave portion 66 that open toward the windshield glass WG side are formed in the lower surface 42A of the nozzle main body portion 42. The first main jetting hole 54 (the second main jetting hole 64) is formed at the bottom surface 56A (the bottom surface 66A) of the first concave portion 56 (the second concave portion 66). Therefore, the washing liquid that is jetted-out from the first main jetting hole 54 (the second main jetting hole 64) passes-through the first area 58 (the second area 68) at the interior of the first concave portion 56 (the second concave portion 66), and thereafter, is jetted-out toward the arm lower side from the lower surface 42A of the nozzle main body portion 42. Namely, the first concave portion 56 (the second concave portion 66) acts as a windbreak with respect to the washing liquid that is jetted-out from the first main jetting hole 54 (the second main jetting hole 64). As a result, a decrease in the jetting-speed immediately after the jetting-out of the washing liquid from the first main jetting hole 54 (the second main jetting hole 64) is prevented, and the washing liquid can be jetted-out well from the first main jetting hole 54 (the second main jetting hole 64). In particular, because the first concave portion 56, that corresponds to the first flow path 50 and that jets the washing liquid out toward the arm base end side, is formed so as to open and face the windshield glass WG (so as to not open toward the arm base end side), the washing liquid that is jetted-out from the first main jetting hole 54 is jetted-out without facing the airflow W1 that flows from the base end side toward the distal end side of the wiper arm 12. Moreover, the majority of the airflow W1, that flows from the base end side toward the distal end side of the wiper arm 12 at the nozzle main body portion 42, is rectified toward the upper side of the nozzle main body portion 42 by the inclined surface 42C, and flowing-in of the airflow W1 in between the first concave portion 56 and the windshield glass WG is reduced. Therefore, even if the washing liquid that is jetted-out from the first main jetting hole 54 escapes from the first concave portion 56 and the operation as a windbreak cannot be given to the washing liquid, it is difficult for the washing liquid to be affected by the airflow W1, and the washing liquid can be landed at the desired position.

Further, the bottom surface 56A (the bottom surface 66A, the bottom surface 76A) of the first concave portion 56 (the second concave portion 66, the third concave portion 76) is disposed along a direction orthogonal to the length direction of the first flow path 50 (the second flow path 60, the third flow path 70). Namely, the angle θ1 (the angle θ2, θ3), that is formed by the bottom surface 56A (the bottom surface 66A, the bottom surface 76A) of the first concave portion 56 (the second concave portion 66, the third concave portion 76) and the inner peripheral surface of the first flow path 50 (the second flow path 60, the third flow path 70), is set to be constant in the peripheral direction of the first main jetting hole 54 (the second main jetting hole 64, the third main jetting hole 74). Therefore, the washing liquid that is jetted-out from the first main jetting hole 54 (the second main jetting hole 64, the third main jetting hole 74) can be made to land at a predetermined position, as compared with a case in which the angle θ1 (the angle θ2, θ3) varies in the peripheral direction of the first main jetting hole 54 (the second main jetting hole 64, the third main jetting hole 74).

Namely, if the angle θ1 (the angle θ2, θ3) varies in the peripheral direction of the first main jetting hole 54 (the second main jetting hole 64, the third main jetting hole 74), the washing liquid that is jetted-out from the first main jetting hole 54 (the second main jetting hole 64, the third main jetting hole 74) is, due to the surface tension of the washing liquid, pulled toward the larger side of the angle θ1 (the angle θ2, θ3) and tends to tilt with respect to the desired jetting axis that is parallel to the length direction of the first flow path 50 (the second flow path 60, the third flow path 70). To address this, by making the angle θ1 (the angle θ2, θ3) constant in the peripheral direction of the first main jetting hole 54 (the second main jetting hole 64, the third main jetting hole 74), the washing liquid that is jetted-out from the first main jetting hole 54 (the second main jetting hole 64, the third main jetting hole 74) is jetted-out along the aforementioned jetting axis. Accordingly, the washing liquid that is jetted-out from the first main jetting hole 54 (the second main jetting hole 64, the third main jetting hole 74) can be made to land at a predetermined position, as compared with a case in which the angle θ1 (the angle θ2, θ3) varies in the peripheral direction of the first main jetting hole 54 (the second main jetting hole 64, the third main jetting hole 74).

Further, as described above, the sectional surface area of the first concave portion 56 (the second concave portion 66, the third concave portion 76) as seen from the length direction of the first flow path 50 (the second flow path 60, the third flow path 70) is set so as to become larger toward the opening side (the windshield glass WG side) of the first concave portion 56 (the second concave portion 66, the third concave portion 76). Namely, the first concave portion 56 (the second concave portion 66, the third concave portion 76) is formed so as to become wider toward the windshield glass WG side. Due thereto, hitting of the washing liquid, that is jetted-out from the first main jetting hole 54 (the second main jetting hole 64, the third main jetting hole 74), and the inner peripheral surface of the first concave portion 56 (the second concave portion 66, the third concave portion 76) can be reduced.

Further, when the length direction cross-section of the nozzle main body portion 42 is seen from the transverse direction of the wiper arm 12, the first flow path 50 is inclined toward the arm lower side (the windshield glass side) while heading toward the arm base end side. Therefore, even in a case in which the airflow W1 flows at the side of the wiper arm 12 from the arm base end side toward the arm distal end side, the washing liquid can be jetted-out toward the arm base end side. Due thereto, the washing liquid can be jetted-out in a wide range in the length direction of the wiper blade 30.

Moreover, at the wiper arm 11 equipped with a nozzle, the engaging hook 48 of the main nozzle 40 is engaged with the engaging hole 24 due to the nozzle connecting portion 44 (the main nozzle 40) being slid toward the length direction one side of the wiper arm 12 in a state in which the nozzle connecting portion 44 of the main nozzle 40 is inserted-through the interior of the insert-through hole 22 of the side wall portion 14B. Therefore, the assembly direction at the time of assembling the main nozzle 40 to the wiper arm 12 can be made to be two different directions (two actions). Due thereto, even in a case in which the engaged state of the engaging hook 48 and the engaging hole 24 were to be cancelled, in order to separate the main nozzle 40 from the wiper arm 12, the main nozzle 40 would have to be slid toward the length direction other side of the wiper arm 12, and the main nozzle 40 would have to be moved toward the transverse direction one side of the wiper arm 12. Therefore, even if the engaged state of the engaging hook 48 and the engaging hole 24 were to be cancelled, it would be difficult to separate the main nozzle 40 from the wiper arm 12. Further, the first hose 90 for the main nozzle is connected to the distal end portion of the nozzle connecting portion 44, and moreover, the first hose 90 for the main nozzle is connected from the length direction one side of the wiper arm 12 that is the sliding direction at the time of assembling the main nozzle 40. Therefore, even if the engaged state of the engaging hook 48 and the engaging hole 24 were to be cancelled, the sliding of the main nozzle 40 toward the length direction other side would be further suppressed by the tension of the first hose 90 for the main nozzle, and the situation could be prevented from reaching separating of the main nozzle 40 from the wiper arm 12.

Further, the engaging hook 48 is provided at the nozzle connecting portion 44. Therefore, the engaging hook 48 can be placed efficiently as compared with a case in which the engaging hook 48 is provided at a region different than the nozzle connecting portion 44 (e.g., a case in which the engaging hook 48 is provided separately at the nozzle main body portion 42). As a result, an increase in size of the main nozzle 40 can be suppressed. Further, because the engaging hook 48 is provided at the nozzle connecting portion 44, even though the nozzle main body portion 42 is disposed at the outer side of the wiper arm 12, the nozzle connecting portion 44, i.e., the engaging hook 48, is disposed at the inner side of the wiper arm 12 (between the pair of side wall portions 14B, 14C) via the insert-through hole 22. Thus, it is difficult for direct external force (e.g., collision of a clump of snow or the like) to be applied to the engaging hook 48. As a result, cancelling of the engaged state of the engaging hook 48 and the engaging hole 24 is prevented.

Moreover, even if the engaged state of the engaging hook 48 and the engaging hole 24 were to be cancelled, and the hook portion 48B of the engaging hook 48 were to ride-up on the inner side surface of the side wall portion 14B, pushing force toward the transverse direction other side of the wiper arm 12 would be applied from the side wall portion 14B to the engaging hook 48. Namely, as seen from the arm lower side, pushing force in the direction orthogonal to the length direction of the wiper arm 12 (the direction orthogonal to the sliding direction at the time of assembling the main nozzle 40 to the wiper arm 12) would act on the main nozzle 40. Therefore, even if the engaged state of the engaging hook 48 and the engaging hole 24 were to be cancelled, this pushing force would not act on the arm distal end side (i.e., in the direction of removing the main nozzle 40 from the wiper arm 12), and therefore, it would be difficult to separate the main nozzle 40 from the wiper arm 12.

Moreover, in the state in which the engaging hook 48 and the engaging hole 24 are engaged (the state in which the main nozzle 40 is assembled to the wiper arm 12), the insert-through hole 22 is covered by the nozzle main body portion 42 from the transverse direction one side of the wiper arm 12. Therefore, even though the insert-through hole 22, through which the nozzle connecting portion 44 is inserted, is formed in the arm main body portion 14 in order to place the nozzle connecting portion 44 at the inner side of the wiper arm 12, the main nozzle 40 can be assembled to the wiper arm 12 without spoiling the design of the wiper arm 12.

Further, in the state in which the engaging hook 48 is engaged with the engaging hole 24 (the state in which the main nozzle 40 is assembled to the wiper arm 12), the edge portion of the insert-through hole 22 at the side wall portion 14B is disposed in the slit 46 of the main nozzle 40. Therefore, there can be a structure in which the side wall portion 14B is nipped-in by the nozzle main body portion 42 and the nozzle connecting portion 44. Due thereto, relative movement of the main nozzle 40 with respect to the wiper arm 12 in the transverse direction of the wiper arm 12 can be limited. Further, the assembled strength of the main nozzle 40 in the transverse direction of the wiper arm 12 can be increased.

Moreover, the engaging hook 48 extends toward the base end side of the nozzle connecting portion 44 from the distal end side of the nozzle connecting portion 44 (in detail, the distal end portion of the connecting main body portion 45). Further, the engaging hook 48 and the engaging hole 24 are engaged in a state in which the engaging hook 48 is elastically deformed. Therefore, rattling of the main nozzle 40 in the state in which the main nozzle 40 is assembled to the wiper arm 12 can be prevented. Further, because the engaging hook 48 itself elastically deforms, the stress that is applied to the nozzle connecting portion 44 can be reduced as compared with a case in which the hook portion 48B were to be formed at the nozzle connecting portion 44 and the nozzle connecting portion 44 were to elastically deform. Due thereto, deformation and the like of the nozzle connecting portion 44 can be decreased or prevented even in a case in which the engaging hook 48 is provided at the nozzle connecting portion 44.

Further, the nozzle main body portion 42 is disposed at the transverse direction one side of the wiper arm 12 with respect to the fin 38 of the wiper blade 30. Therefore, in the state in which the wiper blade 30 is disposed in a vicinity of the stopped position, the nozzle main body portion 42 is disposed at the downstream side of the traveling wind, that arises during traveling of the vehicle, with respect to the fin 38 of the wiper blade 30. Due thereto, at the stopped position, the washing liquid, that is jetted-out from the first main jetting hole 54, the second main jetting hole 64, the third main jetting hole 74 of the main nozzle 40, being affected by the traveling wind can be reduced, and the washing liquid can more reliably be made to land at the predetermined positions. Namely, in the state in which the wiper blade 30 is disposed in a vicinity of the stopped position, at the traveling wind upstream side with respect to the nozzle main body portion 42, this traveling wind is guided toward the upper side by the fin 38. Further, because the wiper blade 30 is structured as a so-called liverless-type wiper blade, the traveling wind does not pass between levers and does not flow toward the nozzle main body portion 42 side, as with a lever-type wiper blade. Due thereto, in a vicinity of the stopped position, the washing liquid, that is jetted-out from the first main jetting hole 54, the second main jetting hole 64, the third main jetting hole 74 of the main nozzle 40, being affected by the traveling wind can be suppressed, and the washing liquid can more reliably be made to land at the predetermined positions.

Second Embodiment

A vehicle wiper device 200 of a second embodiment is described hereinafter by using FIG. 16. The vehicle wiper device 200 of the second embodiment is structured similarly to the first embodiment except for the following points. Namely, at the vehicle wiper device 10 of the first embodiment, washing liquid is supplied to the main nozzle 40 and the sub-nozzle 100 by hoses of two systems. In other words, in the first embodiment, the nozzle connecting portion 44 of the main nozzle 40 is connected to the first washer pump of the vehicle via the first hose 90 for the main nozzle, the first hose joint 92 and the second hose 94 for the main nozzle. Further, the sub-nozzle connecting portion 101 of the sub-nozzle 100 is connected to the second washer pump of the vehicle via the first hose 104 for the sub-nozzle, the second hose joint 106 and the second hose 108 for the sub-nozzle.

In contrast, in the second embodiment, the washing liquid is supplied to the main nozzle 40 and the sub-nozzle 100 by hoses of one system. Namely, the second embodiment has a piping section 202 for supplying the washing liquid to the main nozzle 40 and the sub-nozzle 100, and the piping section 202 is connected in series to the main nozzle 40 and the sub-nozzle 100. This is described concretely hereinafter.

The piping section 202 has a first hose 204, that serves as a "hose" and that connects a washer tank and the sub-nozzle 100 via a washer pump, and a second hose 206 that serves as a "hose" and that connects the sub-nozzle 100 and the main nozzle 40. Further, the piping section 202 has a branching portion 208 at the sub-nozzle 100. The branching portion 208 divides the washing liquid that is fed (supplied) from the first hose 204 into washing liquid, that heads toward the sub jetting hole 102A, 102B side of the sub-nozzle 100, and washing liquid that heads toward the second hose 206 side.

Further, when washing liquid within the washer tank is fed to the first hose 204 due to a washer pump motor driving, the washing liquid is divided by the branching portion 208, and is jetted-out from the sub jetting holes 102A, 102B of the sub-nozzle 100, and is jetted-out from the first main jetting hole 54, the second main jetting hole 64, the third main jetting hole 74 of the main nozzle 40.

Further, in the second embodiment, when the wiper blade 30 rotates from the stopped position toward the rotating direction one side, washing liquid is jetted-out from the main nozzle 40 and the sub-nozzle 100. Moreover, the (opening) surface area of the sub jetting holes 102A, 102B of the sub-nozzle 100 is set to be small (narrow) as compared with the (opening) surface area of the first main jetting hole 54, the second main jetting hole 64, the third main jetting hole 74 of the main nozzle 40. Therefore, with regard to the jetted amount per unit time of the washing liquid that is jetted-out from the respective jetting holes of the main nozzle 40 and the sub-nozzle 100, the jetted-out amount of the sub-nozzle 100 are fewer than the jetted-out amount of the main nozzle 40.

Further, the total surface area of the surface areas of the first main jetting hole 54, the second main jetting hole 64, the third main jetting hole 74 of the main nozzle 40, and the surface areas of the sub jetting holes 102A, 102B of the sub-nozzle 100, is set to be smaller (more narrow) than the sectional surface area of a portion of the piping section 202 that is the narrowest portion located further toward the upstream side (the first hose 204 side) from the branching portion 208. Further, in the second embodiment, because the sectional surface area (the flow path surface area) of the first hose 204 is set to be constant over the entire length thereof, the sectional surface area of the aforementioned narrowest portion is the sectional surface area of the first hose 204 (the piping immediately before the branching-off by the branching portion 208). Namely, the total surface area of the surface areas of the first main jetting hole 54, the second main jetting hole 64, the third main jetting hole 74 of the main nozzle 40, and the surface areas of the sub jetting holes 102A, 102B of the sub-nozzle 100, is set to be smaller (narrower) than the sectional surface area of the first hose 204.

Further, also at the vehicle wiper device 200 of the second embodiment that is structured as described above, the first water repellent portion 52, the second water repellent portion 62 and the third water repellent portion 72 of the main nozzle 40 are structured of a material (a fluorine resin) that is water repellent, and therefore, operation and effects that are similar to the first embodiment are exhibited.

Further, the second embodiment has the piping section 202 that is for supplying the washing liquid to the main nozzle 40 and the sub-nozzle 100, and the piping section 202 is connected in series to the main nozzle 40 and the sub-nozzle 100. Moreover, the total surface area of the surface areas of the first main jetting hole 54, the second main jetting hole 64, the third main jetting hole 74 of the main nozzle 40, and the surface areas of the sub jetting holes 102A, 102B of the sub-nozzle 100, is set to be smaller (narrower) than the sectional surface area of the first hose 204. Still further, the (opening) surface area of the sub jetting hole 102A, 102B of the sub-nozzle 100 is set to be small (narrow) as compared with the (opening) surface area of the first main jetting hole 54, the second main jetting hole 64, the third main jetting hole 74 of the main nozzle 40. Due thereto, while effects on the jetting performance of the main nozzle 40 are suppressed by providing the sub-nozzle 100 in series with the main nozzle 40 (i.e., while the jetted amount of the washing liquid from the main nozzle 40 is prevented from becoming extremely small), the washing liquid can be jetted-out toward the base end portion side of the wiper blade 30 with better directivity than at the main nozzle 40.

Note that, in the first embodiment and the second embodiment, the main nozzle 40 is manufactured of a fluorine resin, but the main nozzle 40 may be manufactured of another resin material that is water repellent (e.g., a silicone resin). Further, from the standpoint of decreasing or preventing drawing-in of the liquid such as water or the like into the interiors of the first flow path 50, the second flow path 60 and the third flow path 70, it is desirable that the main nozzle 40 (the first water repellent portion 52, the second water repellent portion 62, the third water repellent portion 72) be structured of a material that is water repellent and the aforementioned contact angle θ be greater than or equal to 90°. However, the main nozzle 40 (the first water repellent portion 52, the second water repellent portion 62, the third water repellent portion 72) may be structured of another material that is water repellent, within a scope in which the operation and effects of the present disclosure are exhibited. For example, the first water repellent portion 52, the second water repellent portion 62, the third water repellent portion 72 may be structured of a material that is water repellent and the aforementioned contact angle θ is greater than or equal to 80° such that washing liquid of the extent of a frozen water film remains but the frozen water film can be blown-out by the jetting pressure of the washing liquid.

Further, in the first embodiment and the second embodiment, due to the main nozzle 40 being manufactured of a fluorine resin, the first water repellent portion 52, the second water repellent portion 62, the third water repellent portion 72 are also structured of a material that is water repellent. Instead of this, the first water repellent portion 52, the second water repellent portion 62 and the third water repellent portion 72 may be structured by forming a coating layer by coating a fluorine resin or a silicone resin on the main nozzle 40. Due thereto, the material of the main nozzle 40 can be selected to be another resin material (e.g., PBT or the like) in consideration of, for example, the moldability and the weather-resistance and the like of the main nozzle 40. Further, in this case, it suffices for the fluorine resin or the silicone resin to be coated at least on the inner peripheral surface 50A of the first flow path 50 (the inner peripheral surface 60A of the second flow path 60, the inner peripheral surface 70A of the third flow path 70).

Further, as described above, in the first embodiment and the second embodiment, the first water repellent portion 52, the second water repellent portion 62, the third water repellent portion 72 are structured of a material that is water repellent, by manufacturing the main nozzle 40 of a fluorine resin and forming the first flow path 50, the second flow path 60 and the third flow path 70 in the main nozzle 40. Instead of this, there may be a structure in which members that structure the first flow path 50, the second flow path 60 and the third flow path 70 are made to be separate from the main nozzle 40, and these separate members and the main nozzle 40 are made integral. For example, as shown in FIG. 17, due to tubular members 300, 302, 304, that are tube-shaped and are manufactured from a metal, being structured integrally with the main nozzle 40 by a method such as insert molding or press-fitting or the like, the first flow path 50, the second flow path 60, the third flow path 70 may be structured by the tubular members 300, 302, 304. In this case, the first water repellent portion 52, the second water repellent portion 62 and the third water repellent portion 72 can be structured by coating a fluorine resin or a silicon resin on the tubular members 300, 302, 304.

Further, the aforementioned tubular members 300, 302, 304 are structured as tubular members whose outer peripheral surfaces are pillar-shaped, but the shape of the tubular members 300, 302, 304 is not limited to this. This point is described hereinafter by using the tubular member 300. As shown in FIG. 18, for example, the outer peripheral surface of the tubular member 300 is formed in a spherical shape, and a holding portion 310, that is spherical and that holds the tubular member 300, is formed so as to be recessed at the end portion of the first flow path 50 of the nozzle main body portion 42. Further, the tubular member 300 that is spherical may be rollably press-fit and held in the holding portion 310 of the first flow path 50, and the end surface of this tubular member 300 that is spherical may be the first main jetting hole 54. Due thereto, the direction of the first main jetting hole 54 can be rectified by rolling the tubular member 300 that is spherical with respect to the nozzle main body portion 42. Therefore, for example, the jetting direction of the washing liquid with respect to the windshield glass WG can be rectified in accordance with the type of the vehicle or the mounted position of the main nozzle 40.

Note that the first water repellent portion 52, the second water repellent portion 62 and the third water repellent portion 72 are structured by coating a fluorine resin or a silicone resin at the above-described tubular members 300, 302, 304. However, the first water repellent portion 52, the second water repellent portion 62 and the third water repellent portion 72 may be structured by carrying out plating on the aforementioned tubular members 300, 302, 304, and, more concretely, by carrying out plating of nickel that contains fluorine on the aforementioned tubular members 300, 302, 304.

Further, in the first embodiment and the second embodiment, the jetting holes at three places (the first main jetting hole 54, the second main jetting hole 64, the third main jetting hole 74) are formed at the main nozzle 40, but the number of jetting holes at the main nozzle 40 can be set arbitrarily.

Further, in the first embodiment and the second embodiment, the jetting holes at the two places (the sub jetting holes 102A, 102B) are formed at the sub-nozzle 100, but the number of jetting holes at the sub-nozzle 100 can be set arbitrarily.

Further, although the main nozzle 40 is provided at the wiper arm 12 in the first embodiment and the second embodiment, there may be a structure in which the main nozzle 40 is provided at the wiper blade 30.

Further, in the first embodiment and the second embodiment, the bottom surface 56A (the bottom surface 66A, the bottom surface 76A) of the first concave portion 56 (the second concave portion 66, the third concave portion 76) is disposed along a direction orthogonal to the length direction of the first flow path 50 (the second flow path 60, the third flow path 70). Namely, the angle θ1 (θ2, θ3) is set to 90°. Instead of this, the angle θ1 (θ2, θ3) may be set to an arbitrary angle.

Further, in the first embodiment and the second embodiment, the sectional surface area of the first concave portion 56 (the second concave portion 66, the third concave portion 76), as seen from the length direction of the first flow path 50 (the second flow path 60, the third flow path 70), is set so as to become larger toward the opening side (the windshield glass WG side) of the first concave portion 56 (the second concave portion 66, the third concave portion 76). Instead of this, the sectional surface area of the first concave portion 56 (the second concave portion 66, the third concave portion 76), as seen from the length direction of the first flow path 50 (the second flow path 60, the third flow path 70), may be set to be constant.

Further, in the first embodiment and the second embodiment, the first concave portion 56 and the second concave portion 66 are formed at the lower surface 42A of the nozzle main body portion 42 of the main nozzle 40, and the third concave portion 76 is formed at the side surface 42D of the nozzle main body portion 42. However, the first concave portion 56, the second concave portion 66 and the third concave portion 76 may be omitted. Namely, the first main jetting hole 54 and the second main jetting hole 64 may be formed at the lower surface 42A of the nozzle main body portion 42, and the third main jetting hole 74 may be formed at the side surface 42D of the nozzle main body portion 42.

Further, in the first embodiment and the second embodiment, the insert-through hole 22 and the engaging hole 24 at the side wall portion 14B are formed separately, but the insert-through hole 22 and the engaging hole 24 may be structured as a single, integral hole portion. Namely, it suffices for the portion through which the nozzle connecting portion 44 of the main nozzle 40 is inserted, and the portion that is engaged by the engaging hook 48 of the main nozzle 40, to be formed by that hole portion.

Further, in the first embodiment and the second embodiment, the insert-through hole 22 of the side wall portion 14B is structured as a hole that is substantially rectangular as seen from the transverse direction of the wiper arm 12. However, the insert-through hole 22 may be formed in the shape of a notch that opens toward the arm lower side, and it is preferable that this notch shape be an L-shape as seen in side view.

Further, in the first embodiment and the second embodiment, the engaging hole 24, that is engaged with the engaging hook 48 of the main nozzle 40, is structured as a hole, but the shape of the portion that is engaged with the engaging hook 48 is not limited to this. For example, there may be a structure in which a convex portion that projects-out toward the transverse direction inner side of the wiper arm 12 is formed at the side wall portion 14B for example, and this convex portion and the engaging hook 48 are engaged.

Further, in the first embodiment and the second embodiment, there may be a structure in which a flange portion, that faces the nozzle main body portion 42 with the slit 46 therebetween, is formed at the nozzle connecting portion 44, and a portion of the insert-through hole 22 is made to be a shape through which this flange portion can pass, and by sliding the main nozzle 40 toward the length direction one side of the wiper arm 12 in the state in which the flange portion is passed-through the insert-through hole 22, the side wall portion 14B at the periphery of the slit 46 is nipped by the flange portion and the nozzle main body portion 42. Due thereto, the assembled state (the assembled posture) of the main nozzle 40 to the wiper arm 12 can be made to be even more stable.

Further, in the first embodiment and the second embodiment, the first water repellent portion 52, the second water repellent portion 62 and the third water repellent portion 72 that are structured of a material (a fluorine resin) that is water repellent are provided at the main nozzle 40. However, a water repellent portion, that is structured of a material (a fluorine resin) that is water repellent, may be applied to the inner peripheral surface of the flow path of the sub-nozzle 100. Moreover, a structure in which a water repellent portion is provided at the inner peripheral surface of a flow path may be applied also to washer nozzles other than the washer nozzles that are provided at the wiper arm 12. For example, the present invention may be applied to a washer nozzle that is provided at a cowl louver or the like of a vehicle.

(Additional Remarks)

A washer nozzle of a first aspect comprises: a nozzle connecting portion to which a hose, that supplies a washing liquid, is connected; a nozzle main body portion having, at an interior thereof, a flow path that communicates with an interior of the nozzle connecting portion and that has a jetting hole that opens toward an exterior at one end side of the flow path, the nozzle main body portion jetting the washing liquid out toward a windshield glass of a vehicle from the jetting hole; and a water repellent portion, at at least a portion of the flow path, structuring an inner peripheral surface that extends to the jetting hole, and being formed of a material that is water repellent.

Further, it is preferable that the nozzle main body portion is manufactured of a fluorine resin or a silicone resin, and that the flow path is formed at the nozzle main body portion.

Further, it is preferable that the water repellent portion is formed due to an inner peripheral surface of the flow path that is formed at the nozzle main body portion being coated by a fluorine resin or a silicone resin.

Further, it is preferable that the flow path is structured by a tubular member that is tube-shaped and that is provided at the interior of the nozzle main body portion, and that the water repellent portion is formed due to an inner peripheral surface of the tubular member being coated by a fluorine resin or a silicone resin.

Further, it is preferable that an outer peripheral surface of the tubular member is formed in a spherical shape, and that the jetting hole is an end surface of the tubular member that is rollably held at one end of the flow path of the nozzle main body portion.

A washer nozzle according to a second aspect comprises: a nozzle main body portion provided at a wiper arm that is rotated reciprocally around an axis of a pivot shaft, and the nozzle main body portion projecting out toward a transverse direction outer side of the wiper arm; a flow path formed at an interior of the nozzle main body portion, and having a jetting hole that opens toward a windshield glass side; and a flow rectifying portion structuring an outer peripheral portion of the nozzle main body portion, and the flow rectifying portion is disposed at a base end side of the wiper arm with respect to the jetting hole, and the flow rectifying portion, as seen from a transverse direction of the wiper arm, is inclined toward the windshield glass side while heading toward the base end side of the wiper arm, and the flow rectifying portion rectifies an airflow that flows from the base end side toward a distal end side of the wiper arm.

Further, it is preferable that a concave portion that opens toward the windshield glass side is formed in the nozzle main body portion, and that the jetting hole is formed at a bottom surface of the concave portion.

Further, it is preferable that an angle, that is formed by the bottom surface of the concave portion and an inner peripheral surface of the flow path, is set to be constant in a peripheral direction of the jetting hole.

Further, it is preferable that a sectional surface area of the concave portion, that is cut in a direction orthogonal to a depth direction of the concave portion, is set to as to become larger toward an opening side of the concave portion.

Further, it is preferable that, as seen from the transverse direction of the wiper arm, the flow path extends toward the windshield glass side while heading toward the base end side of the wiper arm.

A wiper arm equipped with a nozzle according to a third aspect comprises: a wiper arm that is rotated reciprocally around an axis of a pivot shaft; the washer nozzle of the above-described aspects that is provided at the wiper arm, and the nozzle main body portion is disposed at a transverse direction one side of the wiper arm, and the nozzle connecting portion extends from the nozzle main body portion toward a transverse direction other side of the wiper arm; an insert-through portion formed at a side wall at the transverse direction one side of the wiper arm, and through which the nozzle connecting portion is inserted; an engaged portion formed at the side wall at the transverse direction one side, and disposed at a length direction one side of the wiper arm with respect to the insert-through portion, and with which the washer nozzle is engaged; and an engaging portion provided at the nozzle connecting portion, and engages with the engaged portion due to the washer nozzle being slid toward the length direction one side of the wiper arm in a state in which the nozzle connecting portion is inserted-through the insert-through portion.

Further, it is preferable that, in a state in which the engaging portion is engaged with the engaged portion, the nozzle main body portion covers the insert-through portion from the transverse direction one side of the wiper arm.

Further, it is preferable that a slit, that opens toward the length direction one side of the wiper arm, is formed at the washer nozzle between the nozzle main body portion and the nozzle connecting portion, and that, in a state in which the engaging portion is engaged with the engaged portion, an edge of the insert-through portion is disposed in the slit.

A vehicle wiper device according to a fourth aspect comprises: the wiper arm equipped with a nozzle of the above-described aspects; and a wiper blade that is mounted to a distal end portion of the wiper arm, and that reciprocally wipes a windshield glass.

Further, it is preferable to comprise: a sub washer nozzle provided at a region that is further toward a base end side than the washer nozzle at the wiper arm, and the sub washer nozzle has a sub jetting hole that jets washing liquid out toward the windshield glass; and a piping section connected in series to the washer nozzle and the sub washer nozzle, and supplies washing liquid to the washer nozzle and the sub washer nozzle. It is preferable that the piping section has a branching portion that branches the washing liquid off toward the washer nozzle and the sub washer nozzle, and that a sum a surface area of the jetting hole of the washer nozzle and a surface area of the sub jetting hole of the sub washer nozzle is set to be smaller than a sectional surface area of the piping section before branching by the branching portion, and that the surface area of the sub jetting hole of the sub washer nozzle is set to be smaller than the surface area of the jetting hole of the washer nozzle.

A wiper arm equipped with a nozzle according to a fifth aspect comprises: a wiper arm that is rotated reciprocally around an axis of a pivot shaft; a washer nozzle provided at the wiper arm, and having a nozzle main body portion that projects-out toward a transverse direction outer side of the wiper arm; a nozzle portion that is formed at an interior of the nozzle main body portion, and that has a jetting hole that opens toward a windshield glass side; and a flow rectifying portion that structures an outer peripheral portion at the nozzle main body portion, and that is disposed at a base end side of the wiper arm with respect to the jetting hole, and that, as seen from a transverse direction of the wiper arm, is inclined toward the windshield glass side while heading toward the base end side of the wiper arm, and that rectifies an airflow that flows from the base end side toward a distal end side of the wiper arm.

A vehicle wiper device of a sixth aspect comprises: a wiper arm that is rotated reciprocally; a wiper blade that is connected to a distal end portion of the wiper arm; a main nozzle that is provided at the distal end portion of the wiper arm, and that jets washing liquid out onto a wiped surface; a sub-nozzle that is provided at a region that is further toward a base end side than the main nozzle at the wiper arm, and that jets washing liquid out onto the wiped surface; and a piping section that is connected in series to the main nozzle and the sub nozzle and feeds washing liquid to the main nozzle and the sub nozzle, wherein the piping section has a branching portion that becomes branches of a main nozzle side and a sub-nozzle side, and a sum of a surface area of a jetting of the main nozzle and a jetting port of the sub-nozzle is set to be more narrow than a sectional surface area of the piping section before branching of the branching portion, and the jetting port surface area of the sub-nozzle is set to be more narrow than the jetting port surface area of the main nozzle.

The disclosure of Japanese Patent Application No. 2014-103480 that was filed on May 19, 2014, the disclosure of Japanese Patent Application No. 2014-110255 that was filed on May 28, 2014, the disclosure of Japanese Patent Application No. 2014-105488 that was filed on May 21, 2014, and the disclosure of Japanese Patent Application No. 2014-119591 that was filed on Jun. 10, 2014 are, in their entireties, incorporated by reference into the present specification.

What is claimed is:

1. A vehicle wiper device comprising:
a wiper arm rotated reciprocally around an axis of a pivot shaft;
a wiper blade mounted to a distal end portion of the wiper arm, the wiper blade being rotated forwardly from a first position toward a second position and being rotated backwardly from the second position toward the first position, and the wiper blade reciprocally wiping a windshield glass between the first position and the second position;

a washer nozzle provided at the wiper arm, and the washer nozzle having a jetting hole for jetting a washing liquid out toward the windshield glass;

a sub-washer nozzle provided at a region that is between the washer nozzle and the pivot shaft at the wiper arm, and the sub-washer nozzle having a sub-jetting hole for jetting a washing liquid out toward the windshield glass;

a washer system pressure feeding the washer liquid to the washer nozzle and the sub-washer nozzle, a first hose connecting the washer system and the washer nozzle, and a second hose connecting the washer system and the sub-washer nozzle, wherein:

the washer nozzle comprises:

a nozzle connecting portion to which the first hose is connected;

a nozzle main body portion having, at an interior thereof, a flow path that communicates with an interior of the nozzle connecting portion and the jetting hole, the nozzle main body portion jetting the washing liquid out toward the windshield glass from the jetting hole; and a water repellent portion structuring, at at least a portion of the flow path, an inner peripheral surface extending to the jetting hole, and being formed of a material that is water repellent, and wherein:

the washer system is configured to supply the washer liquid to the washer nozzle via the first hose in a case in which the wiper blade is rotated forwardly from the first position toward the second position such that the washer liquid is jetted-out from the washer nozzle toward a forward side in a reciprocal rotating direction of the wiper blade; and the washer system is configured to switch to supply the washer liquid to the sub-washer nozzle via the second hose from the washer nozzle via the first hose when the wiper blade reaches a switching position that is located before of the second position, such that the washer liquid is jetted-out from the sub-washer nozzle toward a backward side in the reciprocal rotating direction of the wiper blade.

2. The vehicle wiper device of claim 1, wherein the nozzle main body portion is manufactured of a fluorine resin or a silicone resin, and the flow path is formed at the nozzle main body portion.

3. The vehicle wiper device of claim 1, wherein the water repellent portion is formed due to being coated by a fluorine resin or a silicone resin.

4. The vehicle wiper device of claim 1, wherein:

the flow path is structured by a tubular member that is tube-shaped and that is provided at the interior of the nozzle main body portion, and the water repellent portion is formed due to being coated by a fluorine resin or a silicone resin.

5. The vehicle wiper device of claim 4, wherein:

an outer peripheral surface of the tubular member is formed in a spherical shape, and the jetting hole is an end surface of the tubular member that is rotatably held at one end of the flow path of the nozzle main body portion.

6. The vehicle wiper device of claim 1, wherein:

the nozzle main body portion projects out toward a transverse direction outer side of the wiper arm;

the jetting hole opens toward a windshield glass side; and a flow rectifying portion structuring an outer peripheral portion of the nozzle main body portion, the flow rectifying portion being disposed at a base end side of the wiper arm with respect to the jetting hole, being inclined toward the windshield glass side while heading toward the base end side of the wiper arm as seen from a transverse direction of the wiper arm, and rectifying an airflow that flows from the base end side toward a distal end side of the wiper arm.

7. The vehicle wiper device of claim 6, wherein, as seen from the transverse direction of the wiper arm, the flow path extends toward the windshield glass side while heading toward the base end side of the wiper arm.

8. The vehicle wiper device of claim 1, wherein a concave portion that opens to the exterior is formed in the nozzle main body portion, and the jetting hole is formed at a bottom surface of the concave portion.

9. The vehicle wiper device of claim 8, wherein an angle, that is formed by the bottom surface of the concave portion and the inner peripheral surface of the flow path, is set to be constant in a peripheral direction of the jetting hole.

10. The vehicle wiper device of claim 8, wherein a sectional surface area of the concave portion, that is cut in a direction orthogonal to a depth direction of the concave portion, becomes larger toward an opening side of the concave portion.

11. The vehicle wiper device of claim 1, wherein:

the nozzle main body portion being disposed at a transverse direction one side of the wiper arm, and the nozzle connecting portion extending from the nozzle main body portion toward a transverse direction other side of the wiper arm;

an insert-through portion formed at a side wall at the transverse direction one side of the wiper arm, and through which the nozzle connecting portion is inserted;

an engaged portion formed at the side wall at the transverse direction one side, disposed at a length direction one side of the wiper arm with respect to the insert-through portion, and with which the washer nozzle is engaged; and an engaging portion provided at the nozzle connecting portion and engaging with the engaged portion due to the washer nozzle being slid toward the length direction one side of the wiper arm in a state in which the nozzle connecting portion is inserted through the insert-through portion.

12. The vehicle wiper device of claim 11, wherein, in a state in which the engaging portion is engaged with the engaged portion, the nozzle main body portion covers the insert-through portion from the transverse direction one side of the wiper arm.

13. The vehicle wiper device of claim 11, wherein:

a slit, that opens toward the length direction one side of the wiper arm, is formed at the washer nozzle between the nozzle main body portion and the nozzle connecting portion, and in a state in which the engaging portion is engaged with the engaged portion, an edge of the insert-through portion is disposed in the slit.

14. The vehicle wiper device of claim 1, further comprising a piping section connected in series to the washer nozzle and the sub washer nozzle, and supplying washing liquid to the washer nozzle and the sub washer nozzle, wherein the piping section has a branching portion that branches the washing liquid off toward the washer nozzle and the sub washer nozzle, wherein a sum of a surface area of the jetting hole of the washer nozzle and a surface area of the sub jetting hole of the sub washer nozzle is smaller than a sectional surface area of the piping section before branching by the branching portion, and wherein the surface area of the sub jetting hole of the sub washer nozzle is set to be smaller than the surface area of the jetting hole of the washer nozzle.

15. The vehicle wiper device of claim 1, wherein:

the washer system is configured to supply the washer liquid to the sub-washer nozzle in a case in which the wiper blade is rotated backwardly from the second position toward the first position such that the washer liquid is jetted-out from the sub-washer nozzle toward the backward side in the reciprocal rotating direction of the wiper blade; and the washer system is configured to switch to supply the washer liquid to the washer nozzle from the sub washer nozzle when the wiper blade reaches a switching position, that is located before of the first position, such that the washer liquid is jetted-out from the washer nozzle toward the forward side in the reciprocal rotating direction of the wiper blade.

16. The vehicle wiper device of claim 1, wherein:

the first position is a position at which the wiper blade is reversed toward the second position, and the second position is a position at which the wiper blade is stopped.

17. A vehicle wiper device comprising:

a wiper arm rotated reciprocally around an axis of a pivot shaft;

a wiper blade mounted to a distal end portion of the wiper arm, the wiper blade being rotated forwardly from a first position toward a second position and being rotated backwardly from the second position toward the first position, and the wiper blade reciprocally wiping a windshield glass between the first position and the second position;

a washer nozzle provided at the wiper arm, and the washer nozzle having a jetting hole for jetting a washing liquid out toward the windshield glass;

a sub-washer nozzle provided at a region that is between the washer nozzle and the pivot shaft at the wiper arm, and the sub-washer nozzle having a sub jetting hole for jetting a washing liquid out toward the windshield glass;

a washer system pressure feeding the washer liquid to the washer nozzle and the sub-washer nozzle, a first hose connecting the washer system and the washer nozzle, and a second hose connecting the washer system and the sub-washer nozzle, wherein:

the washer system is configured to supply the washer liquid to the washer nozzle via the first hose in a case in which the wiper blade is rotated forwardly from the first position toward the second position such that the washer liquid is jetted-out from the washer nozzle toward a forward side in a reciprocal rotating direction of the wiper blade; and the washer system is configured to switch to supply the washer liquid to the sub-washer nozzle via the second hose from the washer nozzle via the first hose when the wiper blade reaches a switching position that is located before of the second position, such that the washer liquid is jetted-out from the sub-washer nozzle toward a backward side in the reciprocal rotating direction of the wiper blade.

18. The vehicle wiper device of claim 17, wherein:

the washer system is configured to supply the washer liquid to the sub-washer nozzle in a case in which the wiper blade is rotated backwardly from the second position toward the first position such that the washer liquid is jetted-out from the sub-washer nozzle toward the backward side in the reciprocal rotating direction of the wiper blade; and the washer system is configured to switch to supply the washer liquid to the washer nozzle from the sub-washer nozzle when the wiper blade reaches a switching position, that is located before of the first position, such that the washer liquid is jetted-out from the washer nozzle toward the forward side in the reciprocal rotating direction of the wiper blade.

19. The vehicle wiper device of claim 17, wherein:

the first position is a position at which the wiper blade is reversed toward the second position, and the second position is a position at which the wiper blade is stopped.

* * * * *